(12) United States Patent
Joyce

(10) Patent No.: US 8,359,212 B2
(45) Date of Patent: *Jan. 22, 2013

(54) SYSTEM AND METHOD FOR PROCESSING DATA RELATED TO LONGEVITY INSURANCE

(75) Inventor: Stephen T. Joyce, West Hartford, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/221,028

(22) Filed: Aug. 30, 2011

(65) Prior Publication Data

US 2011/0313796 A1 Dec. 22, 2011

Related U.S. Application Data

(63) Continuation of application No. 11/654,489, filed on Jan. 17, 2007, now Pat. No. 8,010,388.

(60) Provisional application No. 60/778,477, filed on Mar. 2, 2006.

(51) Int. Cl.
  *G06Q 40/00* (2012.01)
(52) U.S. Cl. ............................................. 705/4
(58) Field of Classification Search ........................ 705/4
   See application file for complete search history.

(56) References Cited

U.S. PATENT DOCUMENTS

| | | | |
|---|---|---|---|
| 5,655,085 A | 8/1997 | Ryan et al. | |
| 5,907,828 A * | 5/1999 | Meyer et al. ...................... | 705/4 |
| 6,085,174 A | 7/2000 | Edelman | |
| 6,611,815 B1 | 8/2003 | Lewis et al. | |
| 6,636,834 B1 | 10/2003 | Schirripa | |
| 7,089,201 B1 | 8/2006 | Dellinger et al. | |
| 7,120,601 B2 | 10/2006 | Chen et al. | |
| 7,376,608 B1 | 5/2008 | Dellinger et al. | |
| 2002/0120474 A1* | 8/2002 | Hele et al. ......................... | 705/4 |
| 2004/0172304 A1 | 9/2004 | Joao | |
| 2005/0055249 A1 | 3/2005 | Helitzer et al. | |
| 2005/0060209 A1* | 3/2005 | Hill et al. ........................... | 705/4 |
| 2005/0060251 A1 | 3/2005 | Schwartz et al. | |
| 2005/0234747 A1* | 10/2005 | Kavanaugh ....................... | 705/4 |
| 2006/0041455 A1* | 2/2006 | Dehais ............................... | 705/4 |
| 2006/0106698 A1* | 5/2006 | Mahaney et al. ................ | 705/35 |
| 2006/0111998 A1 | 5/2006 | Fisher et al. | |
| 2006/0149651 A1 | 7/2006 | Robinson | |
| 2007/0011063 A1 | 1/2007 | Shelon et al. | |
| 2007/0100720 A1* | 5/2007 | Bonvouloir .................. | 705/36 R |
| 2007/0100727 A1 | 5/2007 | Multer et al. | |
| 2007/0106589 A1 | 5/2007 | Schirripa | |

(Continued)

FOREIGN PATENT DOCUMENTS

| | | |
|---|---|---|
| WO | 2004013794 A2 | 2/2004 |
| WO | WO 2006082957 A1 * | 8/2006 |

OTHER PUBLICATIONS

International Search Report mailed Sep. 26, 2007 for related application No. PCT/US2007/005258.

*Primary Examiner* — Jagdish Patel
*Assistant Examiner* — Kevin Poe
(74) *Attorney, Agent, or Firm* — Howard IP Law Group, PC

(57) ABSTRACT

The present invention provides a life insurance product known as longevity insurance. Longevity insurance mitigates longevity risk, the risk that an individual will outlive his or her assets. More specifically, the purchase of longevity insurance guarantees an individual a predetermined, periodic income payment for the life of the purchaser. The guaranteed stream of monthly income commences at a later date, which may be utilized to supplement an existing income level or provide income in the event that the individual outlives his or her accumulated assets.

20 Claims, 24 Drawing Sheets

U.S. PATENT DOCUMENTS

2008/0133278 A1   6/2008   Stanfield
2010/0153140 A1   6/2010   Helitzer et al.

* cited by examiner

FIG. 1A

CONTRACT SPECIFICATIONS ←101  ⌒100

| | |
|---|---|
| CONTRACT OWNER ←— 103 | [ James Scott ] |
| CONTRACT NUMBER ←— 105 | [ Specimen ] |
| CONTRACT ISSUE DATE ←— 107 | [ September 8, 2006 ] |
| SPECIFICATIONS DATE ←— 109 | [ September 8, 2006 ] |
| NAME OF ANNUITANT ←— 111 | [ James Scott ] |
| ANNUITANT DATE OF BIRTH ←— 113 | [ May 1, 1946 ] |
| ANNUITANT GENDER ←— 115 | [ Male] |
| JOINT ANNUITANT ←— 117 | [ N/A ] |
| JOINT ANNUITANT DATE OF BIRTH ←— 119 | [ N/A ] |
| JOINT ANNUITANT GENDER ←— 121 | [ N/A ] |

DESCRIPTION OF BENEFITS ←—131
133 —► INDIVIDUAL FIXED DEFERRED PAYOUT ANNUITY CONTRACT

PREMIUM PAYMENT(S): ↖135

10 Level Annual Premium Payments of $10,000.00, with the first Premium Payment commencing on September 8, 2006 and the final Premium Payment made on January 8, 2016. The Premium Payment is due on the first business day of each month. If premium Payments are not paid as scheduled, a Reduced Paid-Up Annuity benefit and a reduced Paid-Up Facility Care Benefit is provided. "Paid-Up" means no further premiums are payable, but this Contract remains in effect.

137 ↓

ANNUITY COMMENCEMENT DATE: May 1, 2026

ANNUITY AMOUNT: ←—139    $2,400.00

ANNUITY FREQUENCY: ←—141

Monthly, generally on the 1st of the month. If the Annuity Amount is due on a holiday or a Saturday/Sunday, the payment by Us will be made on the prior business day.

ANNUITY PAYMENT INCREASE: —143

We will increase the Annuity Amount by 3% compounded annually starting on the first anniversary of the Annuity Commencement Date. The payment increase does not apply to The Facility Care Benefit.

ANNUITY DESCRIPTION: —145

Single Life Annuity – An annuity is payable during the lifetime of the annuitant, ceasing with the last payment due prior to the Annuitant's death. There is no death benefit.

THE FACILITY CARE BENEFIT: —147

The Facility Care Benefits are subject to the eligibility requirements specified in the facility care benefit rider. Upon meeting the qualifications, the facility care benefit will be as follows: before the Annuity Commencement Date the benefit is equal to 50% of Your Initial Annuity Amount, and After the Annuity Commencement Date the benefit is equal to 50% of Your initial Annuity Amount. The Facility Care Benefit is in addition to Your regular Annuity Amount.

THE FACILITY CARE BENEFIT ELIGIBILITY PERIOD: —149

There is a 10 Year Eligibility Period beginning on Your Contract Issue Date.

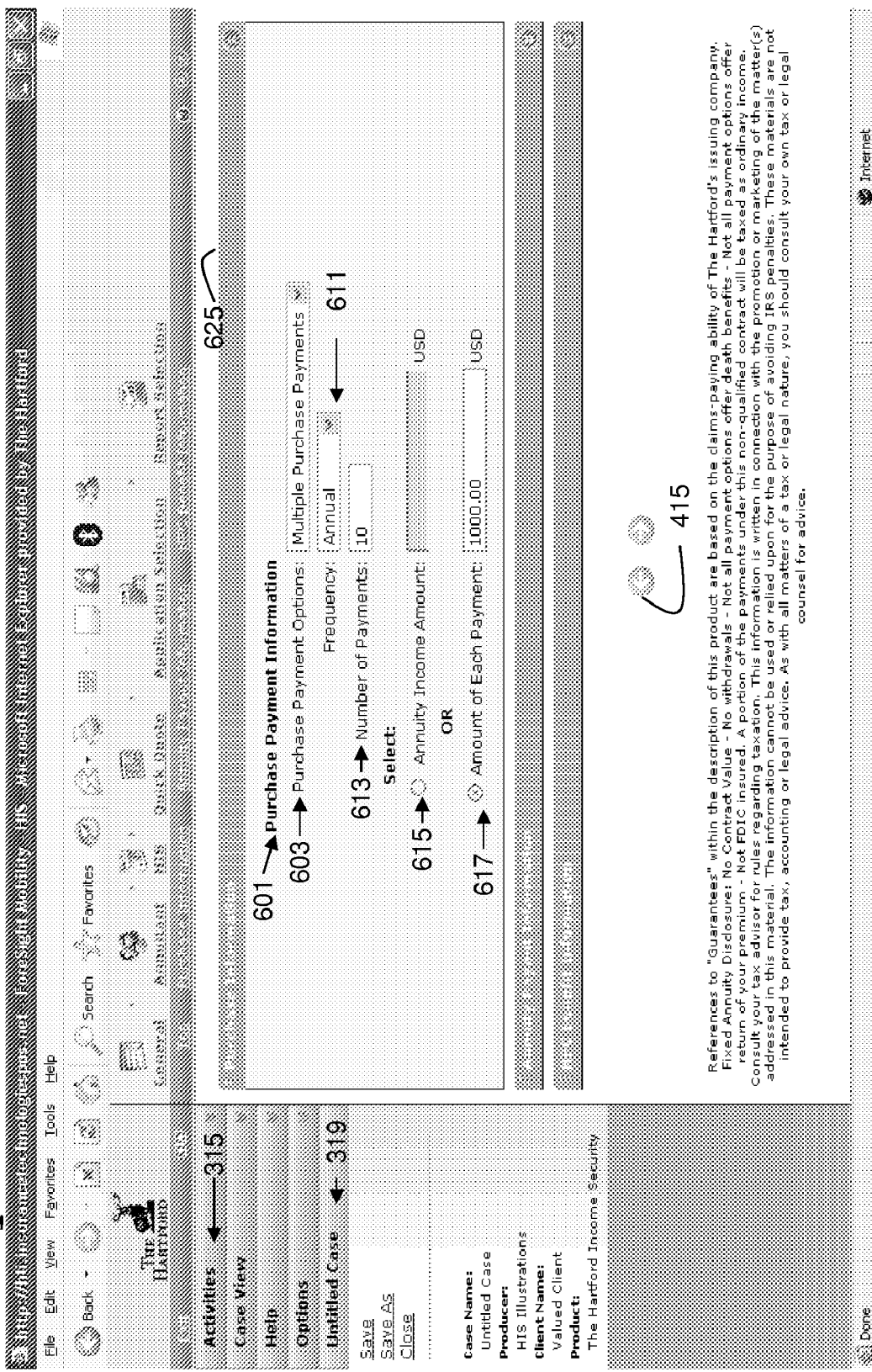

FIG. 8B

| | 853 | 855 | 857 | 859 | 861 | 863 |
|---|---|---|---|---|---|---|
| 1 | | 85 | | $1,872.69 | $8,127.31 | $468.17 |
| 2 | | 86 | $1,928.87 | $1,872.69 | $6,198.45 | $468.17 |
| 3 | | 87 | $1,986.73 | $3,801.55 | $4,211.72 | $468.17 |
| 4 | | 88 | $2,046.33 | $5,788.28 | $2,165.38 | $468.17 |
| 5 | | 89 | $2,107.72 | $7,834.62 | $57.66 | $468.17 |
| 6 | | 90 | $2,170.96 | $9,942.34 | $0.00 | $468.17 |
| 7 | | 91 | $2,236.08 | $12,113.30 | $0.00 | $468.17 |
| 8 | | 92 | $2,303.17 | $14,349.38 | $0.00 | $468.17 |
| 9 | | 93 | $2,372.26 | $16,652.55 | $0.00 | $468.17 |
| 10 | | 94 | $2,443.43 | $19,024.81 | $0.00 | $468.17 |
| 11 | | 95 | $2,516.73 | $21,468.24 | $0.00 | $468.17 |
| 12 | | 96 | $2,592.23 | $23,984.97 | $0.00 | $468.17 |
| 13 | | 97 | $2,670.00 | $26,577.21 | $0.00 | $468.17 |
| 14 | | 98 | $2,750.10 | $29,247.21 | $0.00 | $468.17 |
| 15 | | 99 | $2,832.60 | $31,997.31 | $0.00 | $468.17 |
| 16 | | 100 | $2,917.58 | $34,829.92 | $0.00 | $468.17 |
| 17 | | 101 | $3,005.11 | $37,747.50 | $0.00 | $468.17 |
| 18 | | 102 | $3,095.26 | $40,752.61 | $0.00 | $468.17 |
| 19 | | 103 | $3,188.12 | $43,847.87 | $0.00 | $468.17 |
| 20 | | 104 | $3,283.77 | $47,035.99 | $0.00 | $468.17 |
| 21 | | 105 | $3,382.28 | $50,319.76 | $0.00 | $468.17 |
| 22 | | 106 | $3,483.75 | $53,702.04 | $0.00 | $468.17 |
| 23 | | 107 | $3,588.26 | $57,185.78 | $0.00 | $468.17 |
| 24 | | 108 | $3,695.91 | $60,774.04 | $0.00 | $468.17 |
| 25 | | 109 | $3,806.78 | $64,469.95 | $0.00 | $468.17 |
| 26 | | 110 | $3,920.99 | $68,276.73 | $0.00 | $468.17 |
| | | | | $72,197.72 | | |

SYSTEM AND METHOD FOR PROCESSING DATA RELATED TO LONGEVITY INSURANCE

CROSS-REFERENCE TO RELATED APPLICATIONS

This application is a continuation application of U.S. patent application Ser. No. 11/654,489 entitled LONGEVITY INSURANCE, filed Jan. 17, 2007, which application claims priority to U.S. Provisional Patent Application No. 60/778,477, filed Mar. 2, 2006, the entire contents of all of which are herein incorporated by reference for all purposes.

FIELD OF THE INVENTION

The present invention generally relates to the field of insurance. More specifically, the present invention discloses a novel fixed individual deferred annuity which guarantees an individual (or individuals) a predetermined income starting at a specified time in the future. The annuity further comprises a facility care benefit rider, which can be utilized to accelerate a purchaser's access and/or enhance the predetermined income upon the occurrence of one or more specified events.

BACKGROUND OF THE INVENTION

One of the distinguishing characteristics of human beings from other species is our ability to think and plan ahead. Nevertheless, most people have great trouble preparing for long term future events such as retirement. Thinking and acting on thoughts in advance are keys to preparing for the future when it turns inexorably into the present. The younger a person is, the more time he or she has to plan for retirement. In addition, earlier planning and investing provides an individual with more flexibility and a greater probability of an increased "nest egg" because many investments provide compound returns over time.

Most individuals work at least 40 years with the goal of retiring at approximately 65. After retiring, a typical individual utilizes a predetermined percentage of his or her accumulated assets each year to maintain the lifestyle to which he or she is accustomed. The individual may no longer work to increase the sum total of assets, in which case the individual's income sources are limited to investments, employer's pensions, and government support, if applicable. Furthermore, individuals in their later years can be subject to substantial health care expenses, with the potential of nursing home or assisted living confinement being the most prominent cause for concern. In addition, the average life expectancy is currently approximately 85, and has increased significantly over the last 10 years. As a result of all of these factors, there is a substantial risk that an individual may expend the sum total of his or her accumulated assets before passing away, leaving the individual without independent financial support. This risk, known as "longevity risk," is especially difficult to plan for because of the variety of factors which contribute to it.

Accordingly, retirement planning consists of more than picking an age to retire and a beachfront property on which to retire. In stark contrast, retirement planning requires analysis of an individual's lifestyle, resources, health, marital status, retirement benefits (e.g., health insurance, pensions, etc.) and a myriad of factors that are often taken for granted while an individual is working. Most, but not all such factors, relate to financial issues.

For example, most experts agree that an individual needs about 60% to 85% of his or her current gross household income to sustain a similar lifestyle during his or her post-retirement years. In theory, individuals having a higher current income are closer to the lower end of that scale. In short, current retirement income should approximately equal the individual's gross income less savings and applicable taxes. However, it is widely understood that predicting retirement income is not an easy task. In general, the process of determining an individual's retirement income entails the steps of: (1) deciding on the desired annual income in today's dollars over a period of thirty years or more; (2) establishing a retirement date; (3) contemplating additional, unexpected lifestyle changes; (4) determining a lifetime average inflation rate; (5) determining the average rate of return on investments before and after retirement; and (6) determining the current market value of all current investments (e.g., regular accounts, IRAs, and company tax-deferred savings plans like 401(k) plans). However, many of the variables associated with the above analysis, such as inflation, spending habits, and investment rate of return, are difficult or impossible to predict. In addition, other variables such as the probability of increased expenses due to health problems are nearly impossible to predict. As a result, planning for retirement is extremely difficult and is an inexact science at least.

There have been several attempts to alleviate the difficulties associated with retirement planning and more specifically, to mitigate longevity risk. For example, one simple commonly known method is investing at an early age. For example, if an individual puts $1,000 per year for 25 years into an investment earning 10% annually, the investment will be worth $108,182 after 25 years. Comparatively, by starting that same investment five years later, the net worth of the investment of that same $1,000 per year is only $63,002. However, many people are either not motivated or not financially able to invest early. In addition, there is no guarantee that an investment will yield a net positive return. Finally, although this method allows an individual to accumulate more wealth before retiring, thus putting him or her in a better position, it does not address the situation where an individual lives longer than his or her expected lifespan. As a result, merely planning for retirement earlier is largely ineffective at reducing longevity risk.

Another well-known tool sometimes used to reduce longevity risk is the use of employer retirement plans. Many mid-size and large employers offer various retirement plans to their employees. Indeed, many have two or more. There are several types of retirement plans.

With respect to one such retirement plan, a "defined benefit plan" or a "company pension," employers typically fund a pension account without any financial contributions from the employees. An employee's final benefit (i.e., payment upon retiring) is determined by a formula often based on years of service, an average wage, and a percent of pay. For example, the plan could set a final benefit of a "joint and 50% annuity calculated as 1.5% times years of credited service times the average of an individual's last three years' base annual wage." With 30 years of service, at retirement a pension can replace roughly 45% of an individual's final annual wage.

However, increasingly defined benefit plans are no longer being provided by many employers. This is part of a long-term trend, which virtually all experts agree will continue, and may even accelerate. As a result, defined benefit plans are either unavailable, or, when available, do not provide income levels that adequately alleviate longevity risk.

Another type of investment plan typically offered by employers, a "defined contribution plan," provides an individual account for each participant. The benefits (i.e., the amounts available to the employee in retirement) are based on the amount of funds contributed to the individual's account and are affected by such factors as income, expenses, and investment returns. Some examples of defined contribution plans include 401(k) plans, 403(b) plans, employee stock ownership plans and profit sharing plans.

Often, an employer will make contributions to an employee's account in addition to an individual's contribution. While these contributions vary by employer, employers typically match an individual's contribution from 50% to 100% up to 6% of an individual's pay. In short, if an individual contributes 6% of his or her paycheck to the retirement account, an employer contributes between 3% and 6% as well. While defined contribution plans have certain advantages, defined contribution plans place virtually all of the investment risk on the employee and typically provide no efficient means of converting the accumulated assets into an income stream. As a result, defined contribution plans are largely ineffective as a vehicle for reducing longevity risk.

Another commonly utilized retirement planning vehicle is known as an Individual Retirement Account ("IRA"). An IRA is tax-deferred, so the current tax burdens on an individual are greatly reduced. Once an individual has deposited funds into an IRA, it is subject to IRA rules. A typical IRA, for purposes of this discussion, functions largely as an individual defined contribution plan, but without any employer support. A traditional IRA suffers from all of the deficiencies of a defined contribution plan, when evaluated with respect to longevity risk. Another problem with the IRA is that it limits the contribution amount, which provides less income over time.

Further, it is well known that government subsidized programs exist which alleviate longevity risk. Social Security is one well known example. The Social Security system purports to provide three things: income at retirement, income for survivors, and disability income. Generally, to qualify for full benefits an individual needs to work at least ten years, while contributing a percentage of his or her wages to the Social Security fund. The size of an individual's benefit at retirement is based on earnings and the number of years an individual has paid into the system. An individual may receive retirement benefits on or after age 62. A spouse and, in some cases, dependent children may also receive a benefit.

However, the system was designed to provide for minimum income needs during retirement, and not to provide for all of an individual's income needs. Social Security benefits were designed to supplement an individual's own savings to allow the individual to maintain his or her desired living standard. In addition, it is expected that that the Social Security system will provide future recipients less than it does today, if anything at all. Therefore, although the Social Security system is designed to continue to provide funds to retired individuals even if they live longer than their life expectancy, it is an imperfect system at best for reducing longevity risk.

Finally, the simplest method for mitigating longevity risk is to accumulate a large amount of assets comprised of a diversified portfolio of assets. Then, when an individual retires, he or she simply withdraws a predetermined amount of his or her assets to compensate for any deficiency between the individual's guaranteed income (e.g., defined benefit plans and social security) and his or her lifestyle. This practice, which is currently the most widely used practice, is known as taking systematic withdrawals. However, there are three principal problems with merely taking systematic withdrawals. First, it is impossible to predict an individual's lifespan. As a result, the amount (as a percentage of total assets withdrawn) may be too high, leaving an individual with no asset to draw down from. Alternatively, the individual may be too conservative, withdrawing too little of an amount, compromising his or her lifestyle. In addition, an individual may simply have an insufficient asset pool to draw from. Finally, systematic withdraws do not account for any volatility associated with the asset pool from which the funds are withdrawn. Accordingly, merely taking systematic withdrawals is insufficient for mitigating against longevity risk.

Because current retirement plans and programs have limited success in mitigating longevity risk, there is a clear need in the art for a system and method to more effectively manage the risk associated with outliving one's accumulated assets. The present invention overcomes the various deficiencies associated with traditional longevity risk management techniques by creating a novel system and method that allows an individual to eliminate longevity risk by purchasing longevity insurance.

SUMMARY OF THE INVENTION

The present invention comprises a fixed individual deferred payout annuity. Unlike other individual deferred annuities, the present invention does not have an account value or account balance. It also does not have any surrender value. Further, it need not have any death benefit. As a result, it will not have any explicit guaranteed return and will not have any market value adjustment or other investment gains or losses.

Rather than having an investment account, an individual purchases at an issue date an annuity which provides for the right to receive a specified amount of monthly income starting at a later date (i.e., the "issue date"). The issue date comprises any age that corresponds to a purchaser's age in a range from about 40 years old to 83 years old. For a non-qualified contract the maximum commencement age is 83. While it is contemplated that any earlier date can be chosen, the preferred embodiment of present invention is particularly suited to an annuity start date that corresponds to a date that is at least 20 years later than the date of purchase and that the annuitant's age at commencement is in excess of 70. In other words, the preferred embodiment utilizes an annuity start date that corresponds to the purchaser's approximate life expectancy. However, the income start date could be any date in relation to the purchase date. Further, it is possible that the individual may or may not have the ability to select another start date post purchase.

The commencement date for qualified retirement plans must be in accordance with minimum distribution standards.

After the income start date, the monthly income is payable for the life of the individual. In addition, the present invention contemplates that an individual may purchase the future monthly income for the life of more than one individual, such as a spouse (i.e., a joint purchase). The only prerequisite to receiving the periodic payments is the survival of the individual on the date that payments begin (i.e., the annuitization date). For joint purchases, only one of the named individuals must be alive on the annuitization date for payments to commence.

The present invention provides for a fixed monthly income of normal periodic payments beginning after a deferral period selected at the time of purchase. For example, a customer who has reached the age of 65 can purchase the product and elect for benefits (i.e., guaranteed monthly payments) to begin at age 85. Once commenced, payments would continue for the lifetime of the annuitant. In the preferred embodiment, the minimum deferral period is thirteen months from the last premium deposit, as described in greater detail below.

The present invention also addresses the risk of increased need for additional income due to an unexpected increase in expenses through an optional facility care benefit rider. This enhancement would provide periodic income at an earlier date and, potentially, in an enhanced amount. This additional income is tied to the occurrence of certain defined health care events, including, confinements in a nursing home or similar facility.

Further, the present invention contemplates that an individual may purchase optional riders to further mitigate longevity risk, including but not limited to: a death benefit rider, a CPI indexed income benefit, and an alternative income commencement date rider. It is also contemplated that any other insurance or annuity rider known in the art can be utilized in accordance with the present invention.

The present invention also comprises a method of mitigating longevity risk. Initially, an individual's likely initial retirement asset pool is calculated by determining the individual's feasible retirement income level, and calculating the average monthly income available for his or her lifetime after retirement, as well as any deficiency associated therewith. To compensate for any deficiency or to increase his or her monthly income level, and to ensure that the individual does not outlive his or her accumulated assets, it is contemplated that the individual may utilize existing accumulated assets to generate a guaranteed stream of monthly income at a later date, which may be utilized to supplement an existing income level or provide income in the event that the individual outlives his or her accumulated assets.

After determining a likely initial retirement asset pool, an individual's asset pool spending is determined by estimating the life expectancy of the individual and determining a rate of asset depletion based on the same.

After determining the asset pool spending, the individual mitigates the risk of outliving his or her assets by purchasing the deferred annuity in accordance with the present invention. By purchasing the annuity, the purchaser ensures that he or she will receive a periodic payment to supplement his or her asset pool. Because the payments are guaranteed for the purchaser's life, the purchaser cannot outlive the income provided by the annuity, even if the initial retirement asset pool is totally depleted.

The present invention also comprises a method of offering longevity insurance. The method comprises determining an initial premium payment based on various factors, such as the applicant's sex, age, the periodic income amount that the applicant desires, and the desired annuity date. Of course, it is contemplated that any other known factors can be utilized in accordance with the present invention. In addition, the costs associated with any desired optional riders are added to the premium payment.

After determining the initial premium payment, longevity insurance is offered to the applicant. The terms of the insurance may indicate the annuity date and the periodic payment.

On the annuity date, the offeror of longevity insurance in accordance with the present invention begins to disburse the payments as dictated by the terms of the contract. Payments continue for the life of the applicant.

In light of the foregoing, it is an object of the present invention to mitigate longevity risk.

Further, it is an object of the present invention to provide a financial retirement planning tool or tools which reduce longevity risk.

Yet another object of the present invention is to provide an annuity which reduces longevity risk.

Still another object of the present invention is to provide a method whereby an individual reduces his or her longevity risk.

Another object of the present invention is to provide a method of mitigating longevity risk which accounts for an individual's volatile asset pool.

Still a further object of the present invention is to mitigate longevity risk without utilizing an existing individual's accumulated assets.

Further still, an object of the present invention is to provide the opportunity to combine the ability to mitigate the risk to an individual's asset pool from additional facility care expenses with the ability to mitigate the longevity risk to that same asset pool within the confines of the same product.

Lastly, an additional object of the present invention is to have the benefits provided by the facility care benefit rider be a specified percentage of the base annuity benefit amount, with the specified percentage chosen by the individual.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

FIG. 1A is a sample contract of an annuity product in accordance with the preferred embodiment of the present invention.

FIG. 1B is a continuation thereof of FIG. 1A, depicting a sample contract in accordance with the preferred embodiment of the present invention.

FIG. 6B is a screenshot of the product page of a web-based interface depicting a multiple purchase payment of a sample contract in accordance with the preferred embodiment of the present invention.

FIG. 8B is a screenshot of the quick quote page of a web-based interface depicting the expected payout of a sample contract in accordance with the preferred embodiment of the present invention.

DETAILED DESCRIPTION OF THE PREFERRED EMBODIMENT

Figure 2:
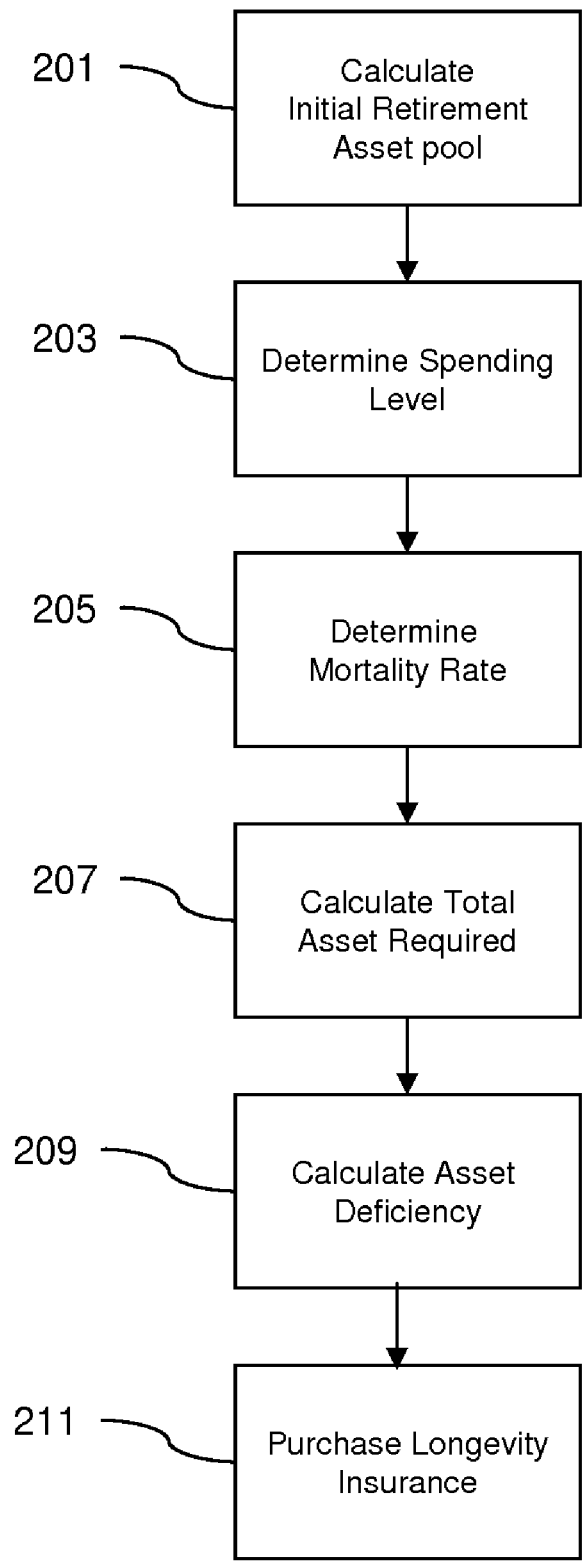
FIG. 2 is a depiction of the sequence of steps of the method for mitigating longevity risk in accordance with the preferred embodiment of the present invention.

A detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific functional details disclosed herein are merely representative, yet in that regard, they are deemed to afford the best embodiment for purposes of disclosure and to provide a basis for the claims herein which define the scope of the present invention.

Moreover, well known methods and procedures for both carrying out the objectives of the present invention and illustrating the preferred embodiment are incorporated herein but have not been described in detail as not to unnecessarily obscure novel aspects of the present invention.

None of the terms used herein, including "annuity", "deferred annuity", "fixed annuity", "fixed deferred annuity", and the like are meant to limit the application of the invention. The terms are used interchangeably for convenience and are not intended to limit the scope of the invention. Similarly, the use of the term "company", "purchaser", or "individual" is not meant to limit the scope of the invention to one type of entity, as any entity or individual can utilize the present invention. The following presents a detailed description of a preferred embodiment of the present invention.

Referring to FIG. 1A, shown is sample longevity insurance contract 100 of an annuity product in accordance with the preferred embodiment of the present invention. Contract 100 generally comprises specifications 101 and description of benefits 131.

Contract specifications 101 represent general identifying indicia of the annuity product in accordance with the present invention. In this example, contract specifications comprise contract owner 103, contract number 105, contract issue date 107, specifications date 109, annuitant name 111, annuitant date of birth 113, annuitant gender 115, joint annuitant 117, joint annuitant date of birth 119, and joint annuitant gender 121.

Contract owner 103 is the purchaser of the annuity product of the present invention. Annuitant 111 is the individual on whose life the contract is issued. In the preferred embodiment, annuitant 111 cannot be changed. It is also contemplated that non-annuitant natural owners can purchase the longevity insurance contract 100 in accordance with the present invention. Further, in the preferred embodiment of the present invention, contract owner 103 and annuitant 111 is the same individual. In addition, annuity contract 100 is assignable. Annuitant gender 115 represents whether the annuitant is male or female.

As is known in the art, contract number 105 is an internal identifying number for use by the issuer.

Contract issue date 107 represents the date as of which the contract is established (i.e., entered into). Similarly, specifications date 109 represents the date of the most current specifications of the contents of annuity contract 100.

As shown in this example, contract 100 has the potential to comprise joint annuitant 117. Joint annuitant 117 is a person in addition to annuitant 111 on whose continuation of life annuity payments may be made. In order to determine the period of payments, if any, contract specifications 101 include joint annuitant date of birth 119. Joint annuitant gender 121 represents whether joint annuitant 117 is male or female. As described in greater detail below, the inclusion of joint annuitant 117 provides several additional annuity payment options.

In this example, description of benefits 131 comprises information relating to premium payments 135, annuity commencement date 137, annuity amount 139, annuity frequency 141, Annuity payment increase 143, annuity description 145, facility care benefit 147, and facility care benefit eligibility period 149.

As shown in 133, the preferred embodiment of the present invention comprises a fixed individual deferred annuity. In contrast to traditional annuities, it does not maintain an account value or account balance and does not have any surrender value. Advantageously, it will not have an explicit total guaranteed return and will not have any market value adjustment or other investment gains or losses. Accordingly, the present invention insulates an individual from market return fluctuations inherent in other retirement planning vehicles. In other embodiments, any other type of annuity can be used.

Premium payments 135 represent the total purchase price of contract 100. Premium payments can be paid in a single sum. Alternatively, as shown in this example, premium payments 135 can be paid in periodic installments (e.g., annually or any other modal payment). Other payment options include payment over a fixed period (e.g., 10 years) or to a specified age (e.g., age 65). It is also contemplated that flexible premium payments can be utilized as is known in the art.

If the course of installment premiums is not completed, the income amounts will be reduced, using appropriate actuarial calculations, and that reduced income benefit will be deemed fully paid.

Premium payment 135 can vary from individual to individual, and can be based on such factors as the individual's age, sex, desired periodic income payment, and the date income payments start. It is contemplated that other variables known in the art can be utilized to determine the premium price of the present invention.

Advantageously, the premium required to purchase future income can be relatively small because of the long deferral period and the late start age. Investment returns during the deferral period allow the provider of the present invention to provide a higher income benefit at the income start date. In addition, the advanced age at which income starts means that there are substantial mortality gains that further enhance the income benefits that the surviving individuals enjoy.

Annuity contract 100 will provide predetermined periodic income payments beginning on annuity commencement date 137. Annuity commencement date 137 is a future date selected by the purchaser within permitted limits. While any date can be chosen, it is contemplated that annuity commencement date 137 corresponds to the purchaser's approximate life expectancy. Preferably, contract 100 comprises a minimum age at which payments can begin (i.e., a minimum issue age and a maximum deferral period) and a maximum age at which payments begin. In the preferred embodiment, the minimum issue age is forty, the maximum commencement age is eighty-three, and the maximum commencement age is eighty-five. Further, annuity commencement date 137 is able to be deferred for a period of time. While this deferral period can be for any period of time, preferably the minimum deferral period is 13 months from the last (or final) premium deposit. As described in greater detail below, payments begin on annuity commencement date 137 and end on the date of annuitant's death. In addition, it is contemplated that annuity commencement date can be changed by mutual agreement of the parties.

Annuity amount 139 represents the periodic income payments purchased by an individual. The frequency of payments is mutually predetermined and represented by 141. In this example, annuity frequency 141 is monthly. However, any other periodic payment frequency, such as quarterly, semi-annually, or annually can be utilized in accordance with the present invention.

As shown in FIG. 1B, the specific payment option of annuity amount 139 is described by annuity description 145. In this example, annuity description 145 depicts a single life annuity. In other words, contract 100 pays out an annuity during the lifetime of annuitant 111, ceasing when annuitant 111 dies.

Other annuity payment options can be utilized in accordance with the present invention. Non-limiting examples include joint life annuity payments, joint and survivor life payments, single life with cash refund payments, joint and survivor life with cash refund payments, single life income with period certain payments, joint life with a period certain, joint and last survivor with period certain, period certain, and joint life annuity with cash refund payments. However, due to tax law constraints, some annuity payment options may not be available for certain qualified contracts.

Under a joint and survivor life payment plan, payments are made to annuitant 111 as long as he or she is alive after annuity commencement date 137. Upon the death of the annuitant 111, payments continue to the surviving joint annuitant 117, at 50%, 75% or 100% of the original payment amount, as chosen at issue, as long as they are alive after annuity commencement date 137. Upon death of both annuitants, payments cease.

Under a joint life annuity payment option, payments are made to annuitant 111 and joint annuitant 117 as long as either is alive after annuity commencement date 137. Upon the death of either annuitant 111 or joint annuitant 117, payments continue to the survivor at 50%, 75% or 100% of the original payment amount, as chosen at issue. Upon death of both annuitants, payments cease.

Under a single life with cash refund payment option, periodic payments are made as long as annuitant 111 is alive after annuity commencement date 137. Upon death of annuitant 111, a lump sum may be payable to a designated beneficiary equal to premium payment 135 paid out less the sum of all payments made. The cash refund benefit reduces to zero over time.

A joint and survivor life with cash refund payment option provides payments to annuitant 111 as long as he or she is alive after annuity commencement date 137. Upon the death of annuitant 111, payments continue to joint annuitant 117 at 50%, 75% or 100% of the original payment amount, as chosen at issue, as long as he or she is alive after annuity commencement date 137. Upon death of both annuitants 111 and 117, payments cease. A lump sum may be payable to their designated beneficiary equal to premium payment 135 paid out less the sum of all payments made. The cash refund benefit reduces to zero over time.

Under a single life income with period certain plan, periodic payments are made as long as annuitant 111 is alive. In addition, payments are guaranteed to continue for period of 5 to 30 years. In other words, if annuitant 111 dies within the fixed period, payments continue to the named beneficiary until the end of the period.

Similarly, a joint and last survivor with period certain makes periodic payments to annuitants 111 and 117 as long as either is alive. Upon the death of the primary annuitant, payments to the surviving secondary annuitant will continue at 100% for the lifetime of the surviving secondary annuitant. However, if neither annuitant 111 or 117 is alive for the full period (set from a range of 5 to 30 years), the remaining payments are guaranteed to a named beneficiary.

A payment for a period certain payment option guarantees payments to annuitant 111 during the specified period (i.e., generally in the 5 to 30 year range, or individual payments at specific points in time). If annuitant 111 dies during that time, payments are paid to a named beneficiary.

Under a joint life annuity with cash refund payment option, payments are made to annuitants 111 and 117 as long as either is alive after annuity commencement date 137. Upon the death of either annuitant 111 or 117, payments continue to the survivor at 50%, 75% or 100% of the original payment amount, as chosen at issue, as long as either is alive. Upon death of both annuitants 111 and 117 payments cease and a lump sum may be payable to their designated beneficiary equal to premium payment 135 paid out less the sum of all payments made. The cash refund benefit reduces to zero over time.

The income payments are fully guaranteed. That is, as long as one of the named individuals survives, he or she will continue to receive payments. However, in the case of annuity with a guaranteed number of payments, no such contingency is needed. Further, it is contemplated that the payments can be transferred, assigned, or commuted based on a specific event, such as divorce or the death of contract owner 103 during the deferral phase.

Contract 100 also comprises optional annuity payment increase 143. This option allows a purchaser to have payments increased by a specified percentage periodically after benefit commencement. In accordance with the preferred embodiment of the present invention, increases in payment can comprise a range from about 0% to about 6% of annuity amount 139.

In the preferred embodiment of the present invention additional income needed to cover certain additional expenses associated with longevity risk is addressed through use of an enhancement known as facility care benefit rider 147. Under this rider, an additional income payment (e.g., 100% of the purchased income amount) would be paid once a specific trigger (i.e., a "facility care event") has occurred. For example, such an event can involve being confined in a convalescent home or similar care facility for a stated period, such as six months.

In the preferred embodiment, the amount paid under facility benefit rider 147 varies based on the election of the annuitant and on whether the event occurs before or after annuity commencement date 137. The differences are highlighted below:

Pre-Annuity Commencement Date Facility Care Benefit

A fixed percentage of annuity amount 139 is paid upon verification of a facility care event before the annuity commencement date 137. The pre-annuity commencement date facility care benefit ceases on the earlier of insufficient proof of an ongoing facility care event or annuity commencement date 137.

Post-Annuity Commencement Date Facility Care Benefit

A fixed percentage of annuity amount 139 is paid upon verification of a facility care event on or after annuity commencement date 137. This amount is paid in addition to annuity amount 139. The post-annuity commencement date facility care benefit ceases upon insufficient proof of an ongoing facility care event.

A facility care event is the event which triggers facility benefit rider 147. In the preferred embodiment, the facility benefit is paid as long as annuitant 111 (or joint annuitant 117 if applicable) offers sufficient proof that:

1) Annuitant 111 is currently confined or has been confined to a nursing home or assisted living facility for the entire elimination period (described below); and 2) During this confinement the facility has provided assistance to annuitant 111 for two or more of the activities of daily living (described below); and 3) Contract 100 has been in force for at least the duration of the eligibility period.

The elimination period is a period of time that needs to elapse from the first occurrence of a facility care event until facility care benefits will commence. In the preferred embodiment this duration is 180 days, however, it is contemplated that any period can be utilized in accordance with the present invention.

While any activity or combination of activities which requires assistance can be chosen to trigger the facility care event, preferably, the activities are two of the six selected from the group consisting of bathing, dressing, continence, eating, movement, and toileting (i.e., getting to and from the restroom).

In the preferred embodiment, facility care benefit 147 is not immediately available upon the purchase of contract 100. Rather, it would become effective at the end of a stated period or the attainment of a stated age (e.g., 10 years or age 65) as depicted by facility care benefit eligibility care period 149. If confinement started during this period, enhanced income payments can start at the completion of the period.

Facility care benefit 147 is also available for joint annuitants. For joint annuitant contracts, the event is triggered by either life. In other words, if both lives have a facility care benefit event, both lives would be entitled to the independent benefits associated with facility care benefit 147. In short, each covered annuitant is entitled to the full amount guaranteed by facility care benefit 147. Further, facility care benefit 147 does not reduce in amount because of survivorship issues. In other words, if one of the joint annuitants passes away, the independent benefits associated with the surviving joint annuitant are not affected in any way.

In the preferred embodiment, facility care benefit rider 147 is incorporated into annuity contract 100 which has a grace period for a late or missed premium payment. In the preferred embodiment, this period is 65 days, however, any time period can be chosen. More specifically, if the owner of the contract is in default after 30 days, the issuer of contract 100 will provide written notification and give the contract owner 35 days to respond.

If the payment is not made, the issuer calculates a reduced annuity amount paid in lieu of original annuity payment 139. Annuity commencement date 137 and annuity frequency 141 remain the same. In short, failure to complete a required course of premium payments will result in an actuarial reduction in benefits, not a total loss of coverage.

Importantly, facility care benefit 147 contains numerous distinctions from traditional long term insurance care coverage. In the preferred embodiment, facility care benefit rider 147 does not require underwriting. As such, it is guaranteed to issue. However, it is contemplated that future embodiments will be underwritten. In addition, premium payment 135 never increases, and as described above, never lapses upon non-payment. Further, facility care benefit 147 has a simple claim verification process as opposed to costly assessments and plans of care as required by long term care health insurance. In short, facility care benefit 147 provides predetermined additional income. Payment of this additional income is unrelated to the actual costs of the facility and are payable regardless of whether the specific facility care expenses are covered by other sources such as Medicaid, Veteran's benefits, or long term health care insurance. In short, even if annuitant 111 has no out-of-pocket costs, the benefits associated with facility care benefit 147 are payable in full.

It is also contemplated that facility care benefit 147 can continue to provide enhanced payments even after the original income start date is reached. For example, it is contemplated that the enhanced benefit would continue in certain circumstances even if the insured is no longer confined in a facility that would qualify under a facility care event. It is also contemplated other health care events, other than confinement in a defined facility, could result in triggering facility care benefit rider 147.

In practical terms, an individual will spend a relatively small portion of his or her nest egg to purchase the longevity insurance of the present invention. With an individual's income stream after the income start date assured, the individual is free to deploy his or her remaining assets to provide retirement income exclusively for the period between the individual's current age and the annuity date. Use of the longevity insurance may also enable an individual to retire earlier or, alternatively, enjoy a higher annual income in retirement. The present invention also allows an individual to better assure that he or she has an estate to pass on to heirs.

The present invention can contain optional riders to further mitigate longevity risk, including a death benefit rider, a Consumer Price Indexed income benefit, and an alternative income commencement date rider, each of which is described in greater detail below.

A death benefit rider can be incorporated into the present invention. If annuitant 111 dies before annuity payment 139 begins, premiums paid for annuity contract, plus some amount of interest, is paid to a named beneficiary as is known in the art. Any other death benefit variation can be utilized in accordance with the present invention.

In addition, the present invention can comprise a Consumer Price Index income benefit rider. This rider provides income benefits that are indexed to reflect increases in the CPI. Increases may commence when income payments start or they may reflect CPI increases from an earlier date, such as the purchase date. Adjustments are made at a predetermined time, such as annually, although it is contemplated that any time period can be used.

It is contemplated that an individual may be allowed to elect to accelerate or postpone when income payments will start with the purchase of an optional alternative commencement date rider. If this option is exercised, there is an actuarial reduction or increase in the amount of the monthly income payment.

It is also contemplated that any other insurance or annuity rider known in the art can be utilized in accordance with the present invention.

Referring next to FIG. 2, depicted is as method of mitigating longevity risk utilizing a longevity insurance contract 100 in accordance with the present invention. Initially, an individual's likely initial guaranteed income sources are evaluated as depicted by step 201. This can be done in any well known manner. For example, guaranteed sources, such as social security, employer's pension plans and the like can be examined to determine an aggregate guaranteed periodic income amount. It is contemplated that any other guaranteed income source can be utilized in this manner. Further, any manner of determining a guaranteed periodic income amount can be utilized, however, in the preferred embodiment, the periodic income sources are added together to determine the guaranteed periodic income amount. It is contemplated that the individual may utilize existing accumulated assets to generate a guaranteed stream of periodic income at a later date, which may be utilized to supplement an existing income level.

Concurrently, an individual's periodic spending level 203 is determined. Typically, this is accomplished by determining an appropriate rate which corresponds to the individual's lifestyle.

By determining the guaranteed income sources 201 and the periodic spending amount 203, an individual's base periodic income deficiency (or surplus) is calculated as represented by 205. Determining the base amount can be done in any manner. For example, the determination can be can be accomplished by subtracting the desired spending amount from the guaranteed sources of income available. For example, assume an individual can determine that his or her guaranteed periodic income is $2,500.00 per period. Further, assume that the individual desires to spend $4,500 per period. By simply subtracting the desired spending amount from the guaranteed amount, a deficiency of $2,000.00 is calculated.

In order to compensate for any deficiency, an individual typically withdraws some portion of his or her accumulated assets. Because an individual's assets are accumulated, the individual may be loath to withdraw the entire deficiency amount. In other words, an individual may fear that he or she will deplete the entire amount of the accumulated assets. At this point, the individual may decide to mitigate longevity risk by purchasing longevity insurance 211 (not shown). More frequently however, an individual will determine an appropriate draw down rate as depicted in 207. Any manner can be utilized to determine an appropriate draw down rate. The individual can estimate his or her life expectancy 209 and calculate the appropriate draw down rate. For example, assume that the individual estimates that he or she will live 20 more years. A simple draw down rate could then be calculated as: (1/estimated life expectancy)*100%. In this case, the draw down rate would be 5%. It is contemplated, however, that any means of determining an appropriate draw down rate can be utilized in accordance with the present invention. Indeed, any draw down rate (as a percentage of accumulated assets) can be utilized.

Of course, there is a risk that the individual will outlive his or her estimated life expectancy. To mitigate this risk, the individual purchases a longevity insurance contract 100 in accordance with the present invention as depicted by step 211. By purchasing the annuity, the purchaser ensures that he or she will receive a periodic payment to supplement his or her guaranteed periodic payment amount. Because the payments are guaranteed for the purchaser's life, the purchaser maintains a steady periodic income flow, even if the accumulated asset pool is totally depleted.

Further, annuity contract 100 comprising facility care benefit rider can be utilized to mitigate the risk of increased periodic expenses due to, for example, confinement to a nursing home or assisted living facility. As an individual ages, the probability of an adverse health related event increases (e.g., heart attack) which may require additional uncontemplated expenses. As a result, the individual's estimated periodic spending amount 203 may be too low. This in turn, leads to an erroneous calculated base amount 205 (i.e., there is more of a deficiency) and a corresponding deficiency in the estimated amount drawn down 207 from accumulated assets. As a result, there is a real risk that an individual suffering an adverse health risk can quickly deplete his or her assets. Since the guaranteed sources of income may not be enough to cover the increased expenses, there is a risk that the individual will not have enough income to pay for his or her unexpected health expenses. To mitigate this risk, the individual purchases a longevity insurance contract 100 in accordance with the present invention as depicted by step 211. By purchasing the annuity, the purchaser ensures that he or she will receive a periodic payment to supplement his or her guaranteed periodic payment amount. Because the payments are guaranteed for the purchaser's life, the purchaser maintains a steady periodic income flow, even if the accumulated asset pool is totally depleted.

The following example highlights the benefits of the present invention.

EXAMPLE

A male age 62 is approaching retirement. Between Social Security and a small pension, he already has $2,000 of monthly income. Assume that he also has $500,000 in investments. Also assume that he needs a minimum of $3,500 in monthly income, but would prefer to have $4,500 or $5,000 of monthly income. If he draws down on his investments at the rate of 4% per year, a conservative rate, he can just make his $3,500 minimum. If he draws down on his investments at an 8% rate, he can reach his $5,000 goal. However, at that rate longevity risk is very high.

Assume that the individual spends $50,000 to buy income security insurance that will pay him $3,000 per month if he lives to age 85, plus facility care benefit rider 147. Rider 147 provides an acceleration of 50% of the annuity benefits after an elimination period if the individual submits proof of a facility care event prior to age 85. Additionally, if the facility care event occurs after age 85, the annuity benefits will increase by 50% and continue for life. The individual can then draw down on his remaining $450,000 of investments at the aggressive 8% rate with the confidence that he will never run out of income.

The present invention preferably uses a web-based system to create and manage a contract 100 of the present invention. After logging on to the Internet in an appropriate manner, a system user accesses a webpage through an IP address as is known in the art. The user can be a sales representative, a contract manager, or any other party. The webpage is an interactive portal allowing comprehensive creation and management of a contract 100.

Figure 3:
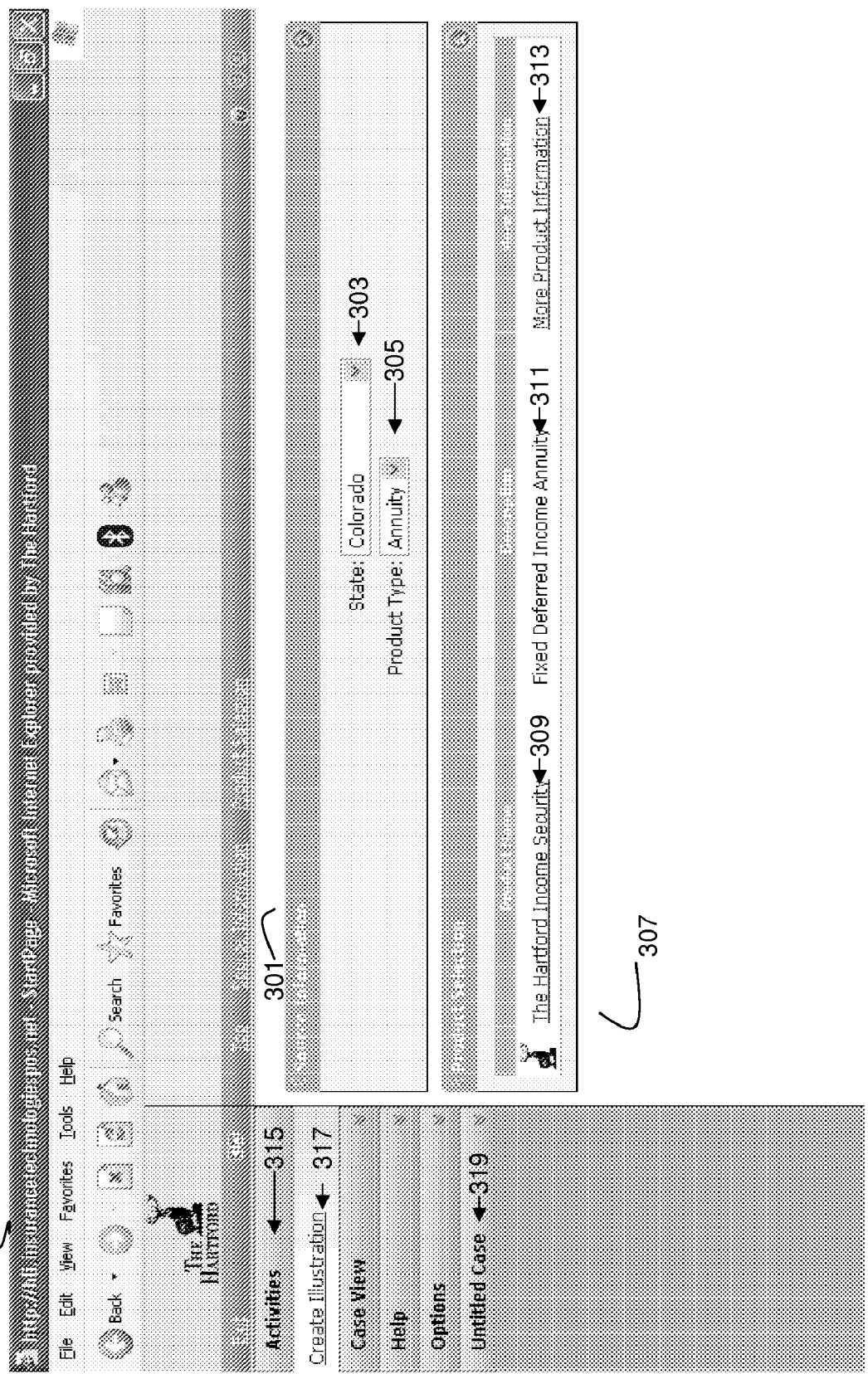
FIG. 3 is a screenshot depicting the source page of a web-based interface for creating and maintaining a sample contract in accordance with the preferred embodiment of the present invention.

FIG. 3 is a screenshot of the preferred web-based portal 300 of the present invention. Web-based portal 300 comprises source information window 301 and product selection window 307.

Source information window 301 comprises state drop down box 303 and product type dropdown box 305. These drop down boxes allow a user to search for particular products by region and type. In this example, the search criteria selected is "Colorado" and "Annuity."

The system searches an associated database (not shown) and displays matching results in product selection window 307. Product selection window 307 displays a list of all products meeting the search criteria and displays relevant information about the product(s) such as product name 309, description 311 and additional information 313. The relevant information is accessed by selecting the appropriate hyperlink. In this example, product selection window shows contract 100 of the present invention.

Web-based portal 300 also comprises a series of hyperlinked tabs which allow a user to access other parts of the web-based system. These tabs include activities tab 315 and untitled case tab 319. By selecting an appropriate tab, a user can access various other features of the web-based system. In this example, selecting activities tab 315 allows a user to access create illustration tab 317. This tab allows a user to create a hypothetical contract and analyze the features, terms, and various returns of a hypothetical contract. It is contemplated that any other management tabs can be placed on web-paced portal 300 which can aid a user in contract 100 creation and/or management.

Figure 4:
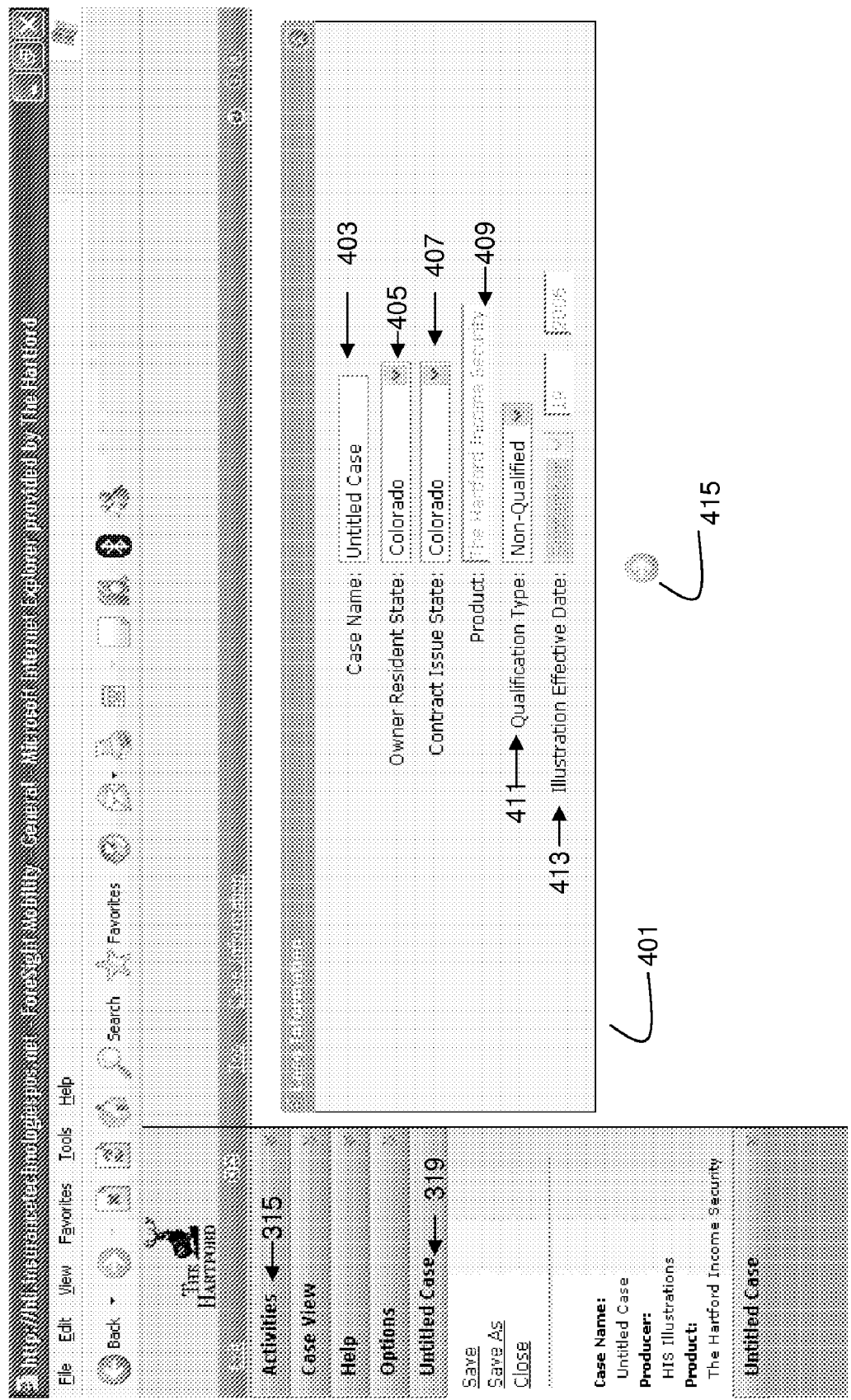
FIG. 4 is a screenshot of the general page of a web-based interface for creating and maintaining a sample contract in accordance with the preferred embodiment of the present invention.

After clicking on create illustration tab 319, a user is directed to general web-page interface 400 as shown in FIG. 4. This interface allows a user to create a contract, or case. General web-page interface comprises activities tab 315 and untitled case tab 319 as previously described. In addition, general web page interface 400 comprises case information window 401.

Web information window 401 allows a user to create a contract 100 by selecting various criteria. After selecting a displayed contract from product selection window 307, case information window 401 displays the product in product text box 309. A user then enters the name of the contract to be created in case name text box 403. The user also provides other general information related to the creation of a contract by inputting additional information in case information window 401. In this example, case window 401 allows a user to provide information via a series of drop boxes. The drop boxes include owner resident state drop box 405, contract issue state drop box 407, qualification type drop box 411, and effective date drop box 413. When the information is entered, a user can access the next phase of the system by selecting scroll button 415. Scroll button 415 also validates the entries on page 400 and saves the data in the aforementioned database.

Figure 5:
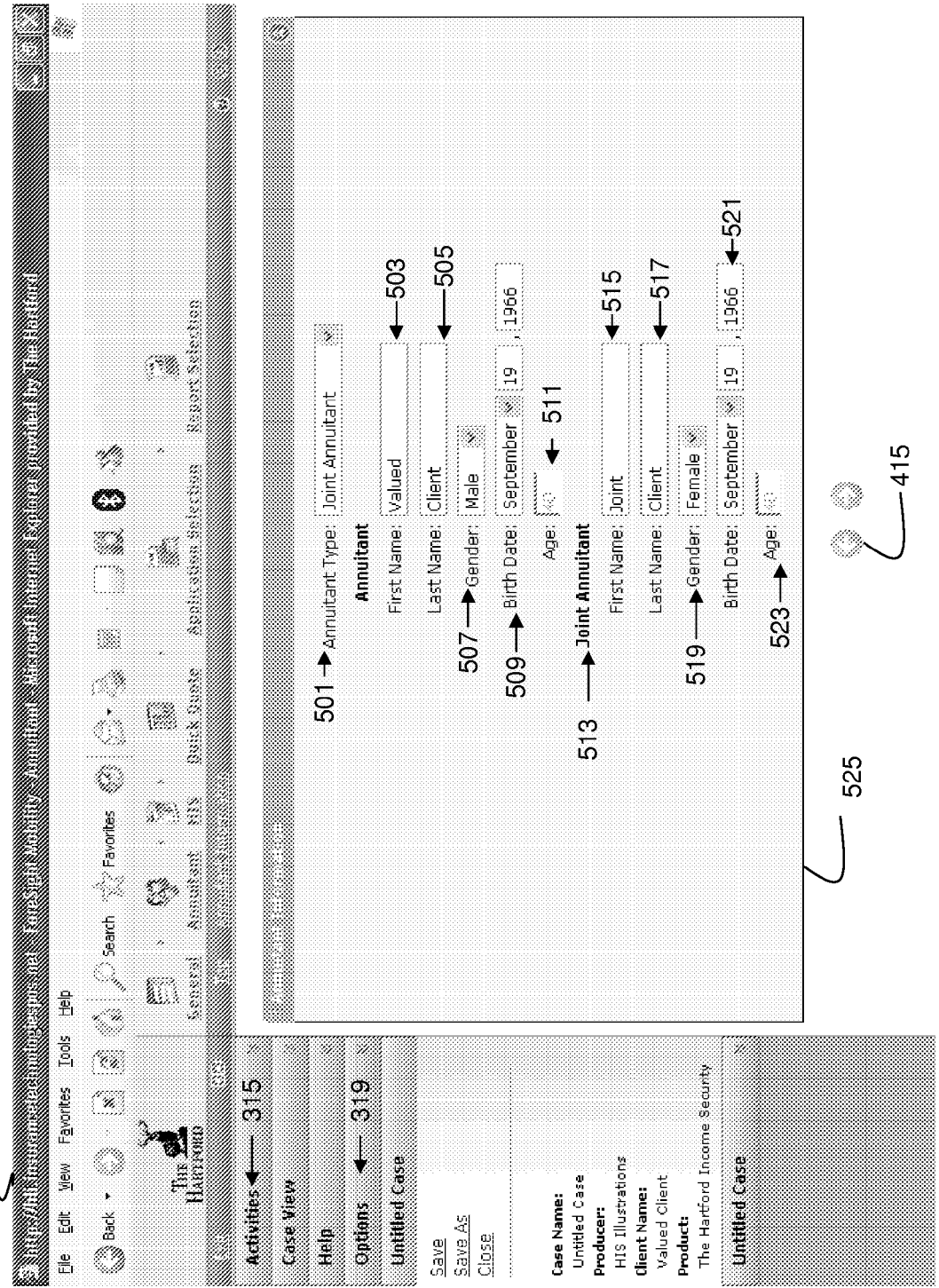
FIG. 5 is a screenshot of the annuitant page of a web-based interface for creating and maintaining a sample contract in accordance with the preferred embodiment of the present invention.

After selecting scroll button 415, a user is directed to annuitant web-interface 500 as shown in FIG. 5. Annuitant web interface 500 allows a user to select the type of annuity contract (i.e., single or joint) and allows a user to enter pertinent data relevant to the annuitant via annuitant information window 525. Annuitant window 525 is a series of text boxes and drop boxes designed to provide all of the information necessary to create a contract 100 in accordance with the present invention. More specifically, annuitant window 525 comprises annuitant type drop box 501 which allows a user to select the type of annuity. In this example, a user has selected a joint annuity.

After selecting the type of annuity, annuitant information window displays additional text and/or drop boxes related to the annuitant type selected. The drop boxes include first name text box 503 and last name text box 505, which allow a user to enter the annuitant's name. Annuitant information window 525 also comprises gender drop box 507, annuitant birth date text box 509, and annuitant age text box 511. The user enters the pertinent information in each of these boxes.

Because annuitant type 501 is a joint annuitant, annuitant information window 525 comprises a series of drop boxes and text boxes so that the user can provide information related to the joint annuitant 513. Annuitant window 525 includes joint annuitant first name text box 515 and joint annuitant last name text box 517 which allow a user to input the joint annuitant's name. Annuitant information window 525 also comprises joint annuitant gender drop box 519, joint annuitant birth date text box 521, and joint annuitant age text box 523. The user enters the pertinent information in each of these boxes. As previously discussed, annuitant web-based interface 500 comprises scroll button 415, which validates the entries on page 500, saves the data in the aforementioned database, and allows a user to access the next phase of the system.

Figure 6A:
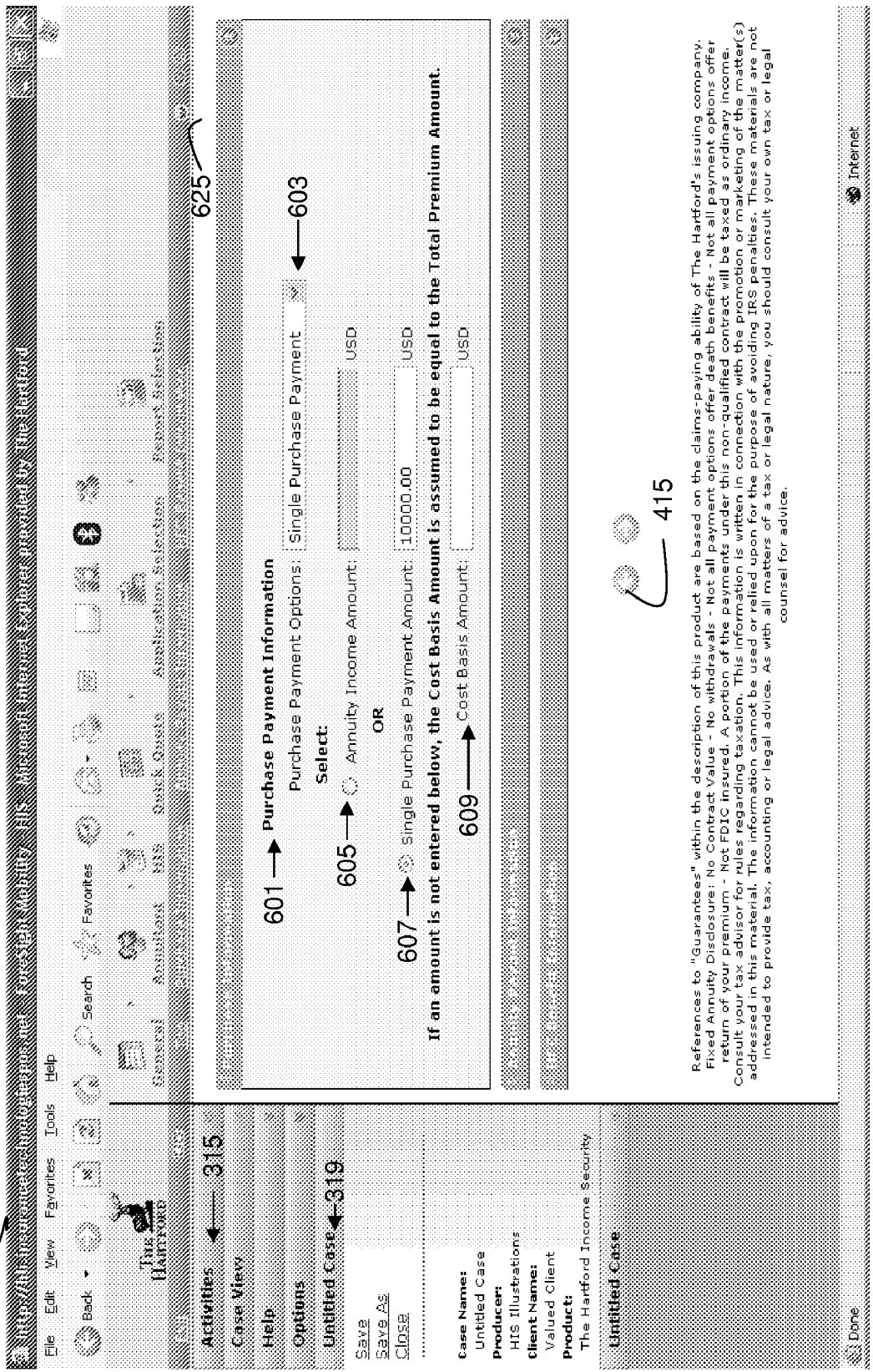
FIG. 6A is a screenshot of the product page of a web-based interface depicting a single purchase payment of a sample contract in accordance with the preferred embodiment of the present invention.

After selecting scroll button 415, a user is directed to purchase information webpage 600 as depicted in FIG. 6A. Purchase information webpage 600 comprises purchase information window 625. Purchase information window 625 allows a user to select purchase payment information 601 through purchase payment option drop box 603. If the user selects "single purchase payment" as in this example, a user has the option to input the desired annuity income amount or to input the single purchase amount by selecting either annuity income amount toggle button 605 or single purchase payment amount toggle button 607. After selecting the appropriate toggle button, the user enters the amount in the accompanying text box. The user also has the option to enter any information related to cost bases by inputting an appropriate amount in cost basis amount text box 609. As previously discussed, purchase information web-based interface 600 comprises scroll button 415, which validates the entries on page 600, saves the data in the aforementioned database, and allows a user to access the next phase of the system.

Alternatively, a user can enter different purchase payment information 601 by choosing multiple purchase payments in purchase payment option drop box 603 as depicted in FIG. 6B. In this instance, the information displayed in purchase information window 625 changes. More specifically, a user inputs information related to the multiple purchase payments such a frequency and number of payments via frequency drop box 611 and number of payments textbox 613. The frequency of payments can be any frequency which is compatible with contract 100 (e.g., monthly, quarterly, semi-annually, or annually). The number of payments can be limited to a maximum amount. For instance, if a user selects a monthly frequency of payments from frequency drop box 611, the number of payments can be set to a maximum of 120. Similarly, as is shown in this example, by selecting annual from frequency drop box, the maximum number of payments is displayed in number of payments textbox 613 (i.e., 10).

A user also can select to input the desired annuity income amount or to input the single purchase amount by selecting either annuity income amount toggle button 615 or payment amount toggle button 617. After selecting the appropriate toggle button, the user enters the amount in the accompanying text box.

As previously discussed, purchase information web-based interface 600 comprises scroll button 415, which validates the entries on page 600, saves the data in the aforementioned database, and allows a user to access the next phase of the system.

Figure 7:
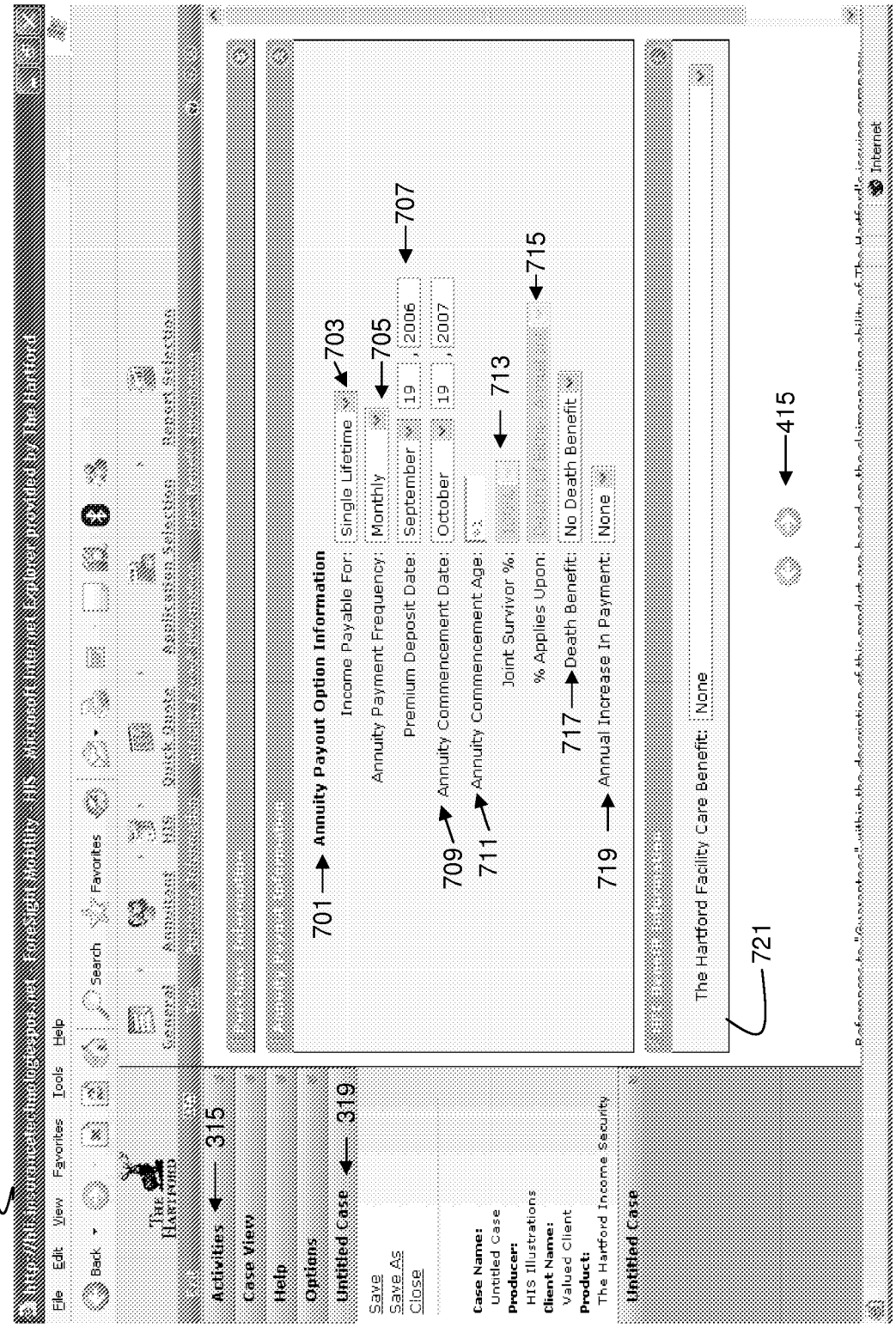
FIG. 7 is a screenshot of the product page of a web-based interface depicting the annuity payout option of a sample contract in accordance with the preferred embodiment of the present invention.

After selecting scroll button 415, a user is directed to annuity payout webpage 700 as depicted in FIG. 7. Annuity payout webpage 700 allows a user to select the type of annuity payment option 701 he or she will receive at the maturity date of contract 100. Annuity payout webpage 700 comprises annuity payout information window 725 and optional benefit window 721.

Annuity payout information window 725 first allows a user to select the type of payment option through income payable drop box 703. The drop box comprises one or more payout options related to contract 100. After selecting a particular payout option, the user selects additional information related to the payout option through a series of drop boxes. The drop boxes pertain information related to the annuity payment options. A user simply selects the appropriate choice from among the available options. In this example, annuity payout option information 701 comprises annuity payment frequency drop box 705, premium deposit date drop box 707, annuity commencement date drop box 709, annuity commencement age drop box 711, and annual increase in payment drop box 719. Other features, such as joint survivor percentage drop box 713 and the joint survivor trigger drop box 715 are contingent upon the type of annuity payment option chosen. That is, if the payment option does not have a joint option, it is "grayed out" and becomes unavailable for selection. Additionally, as shown in this example, a user can opt to select a death benefit from death benefit drop box 717.

Optional benefit window 721 comprises a list of optional riders which are available for the contract. In this example, no optional riders were chosen.

As previously discussed, annuity payout information web-based interface 700 comprises scroll button 415, which validates the entries on page 700, saves the data in the aforementioned database, and allows a user to access the next phase of the system.

Figure 8A:
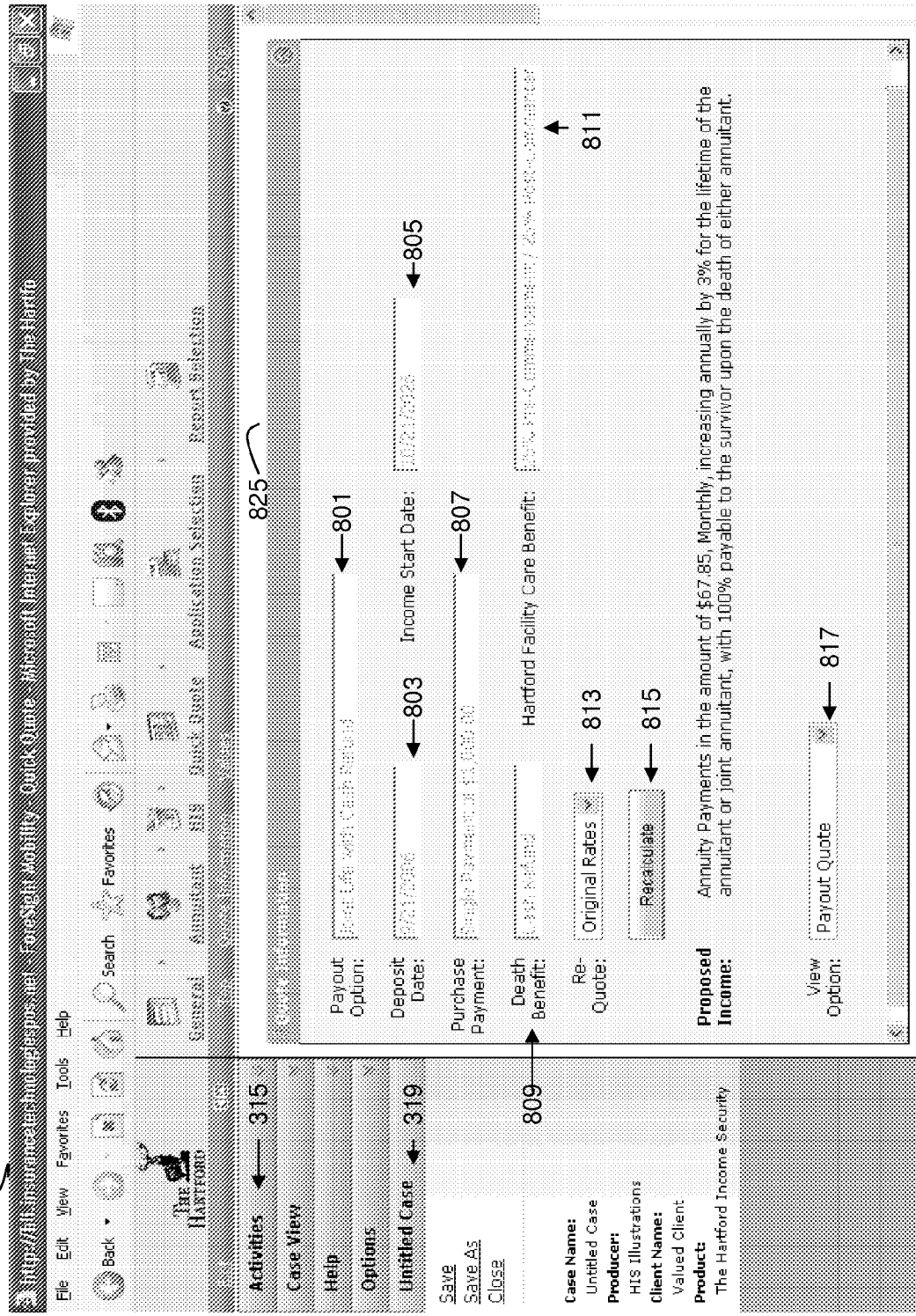
FIG. 8A is a screenshot of the quick quote page of a web-based interface depicting the quote information of a sample contract in accordance with the preferred embodiment of the present invention.

After selecting scroll button 415, a user is directed to quote information webpage 800 as depicted in FIG. 8A. Quote information webpage 800 allows a user to run iterative illustrations related to the information already entered into the system. That is, the information entered in the previous web pages of the present system is displayed in pre-populated text boxes located in quote information window 825. Specifically, quote information window 825 summarizes the payout option chosen through payout option display 801, the premium deposit date via deposit date display 803, the income start date via income start date display 805, the purchase payment type via purchase payment display 807, death benefit chosen via death benefit display 809, and optional riders chosen via optional rider display 811.

A user the selects the rate of the quote via quote drop down box 813 and selects a viewing option via drop box 817. After the information is verified, the user calculates the results by clicking on recalculate button 815. After clicking on this button, a report is displayed in conformance with the option chosen in drop box 817.

In this example, the user has selected to view payout quote 875, an example of which is shown in FIG. 8B.

Payout quote 875 is displayed on web page interface 850 as in previous elements of the system. The report details various payout options over the course of time and succinctly and conveniently displays the payout options in table form. The table provides information related to the number of years from annuity commencement date 851, the annuitant's age 853, any joint annuitant's age 855, monthly income payments 857, aggregate income payments 859, death benefit payout 861, and optional rider payout 863.

Figure 9A:
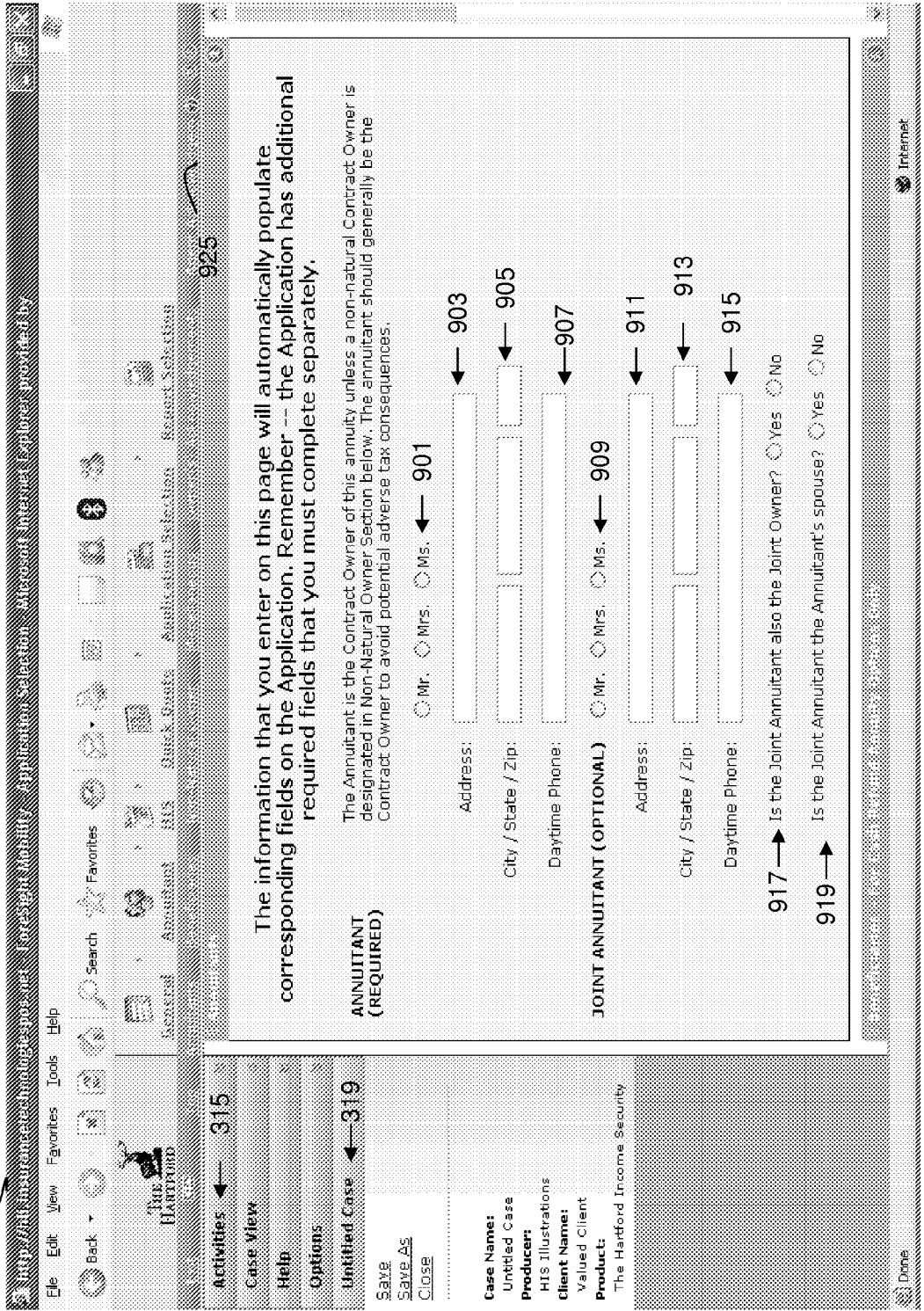
FIG. 9A is a screenshot of the application page of a web-based interface depicting the annuitant information of a sample contract in accordance with the preferred embodiment of the present invention.
Figure 9B:
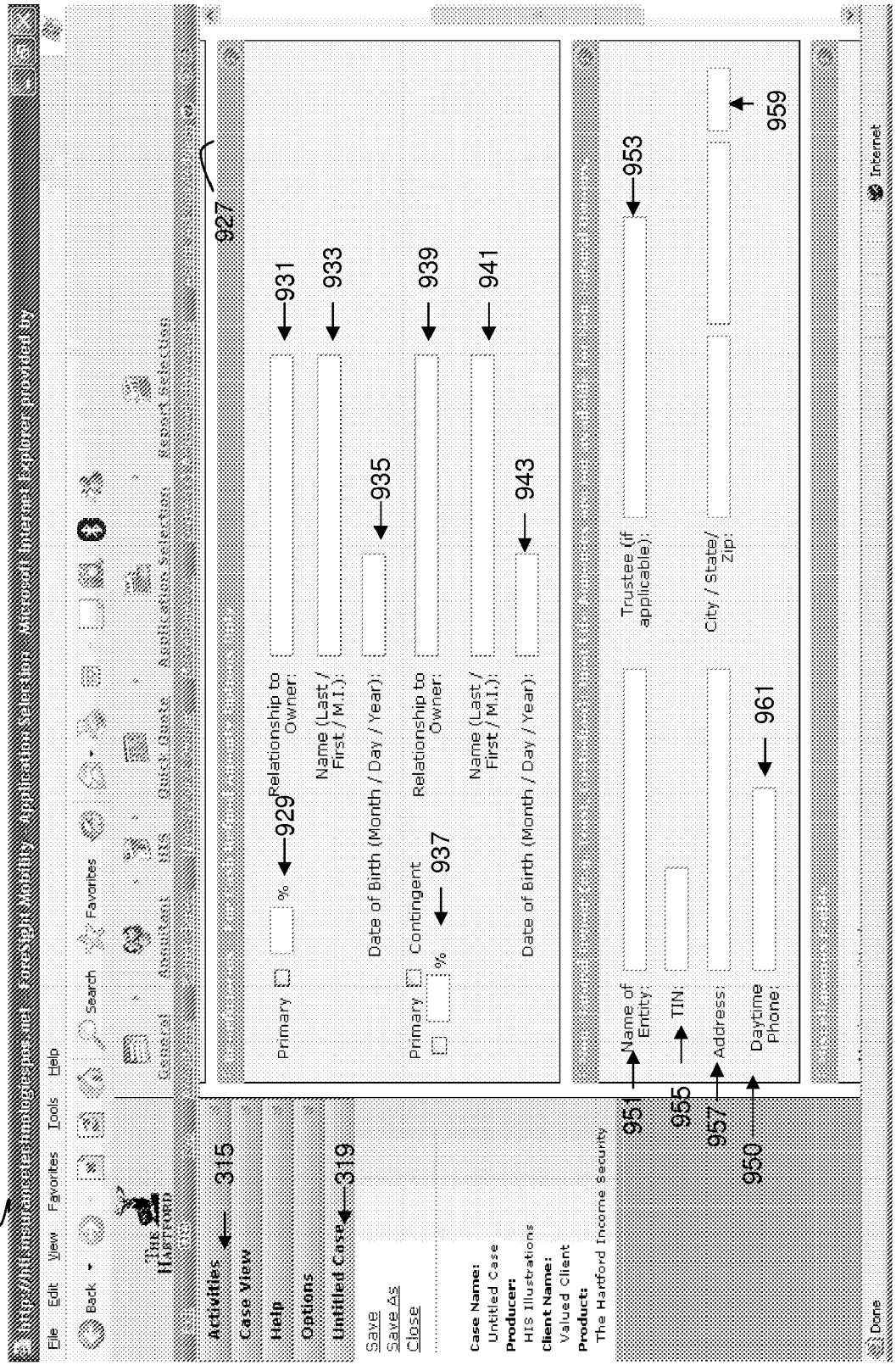
FIG. 9B is a screenshot of the application page of a web-based interface depicting the beneficiary information of a sample contract in accordance with the preferred embodiment of the present invention.
Figure 9C:
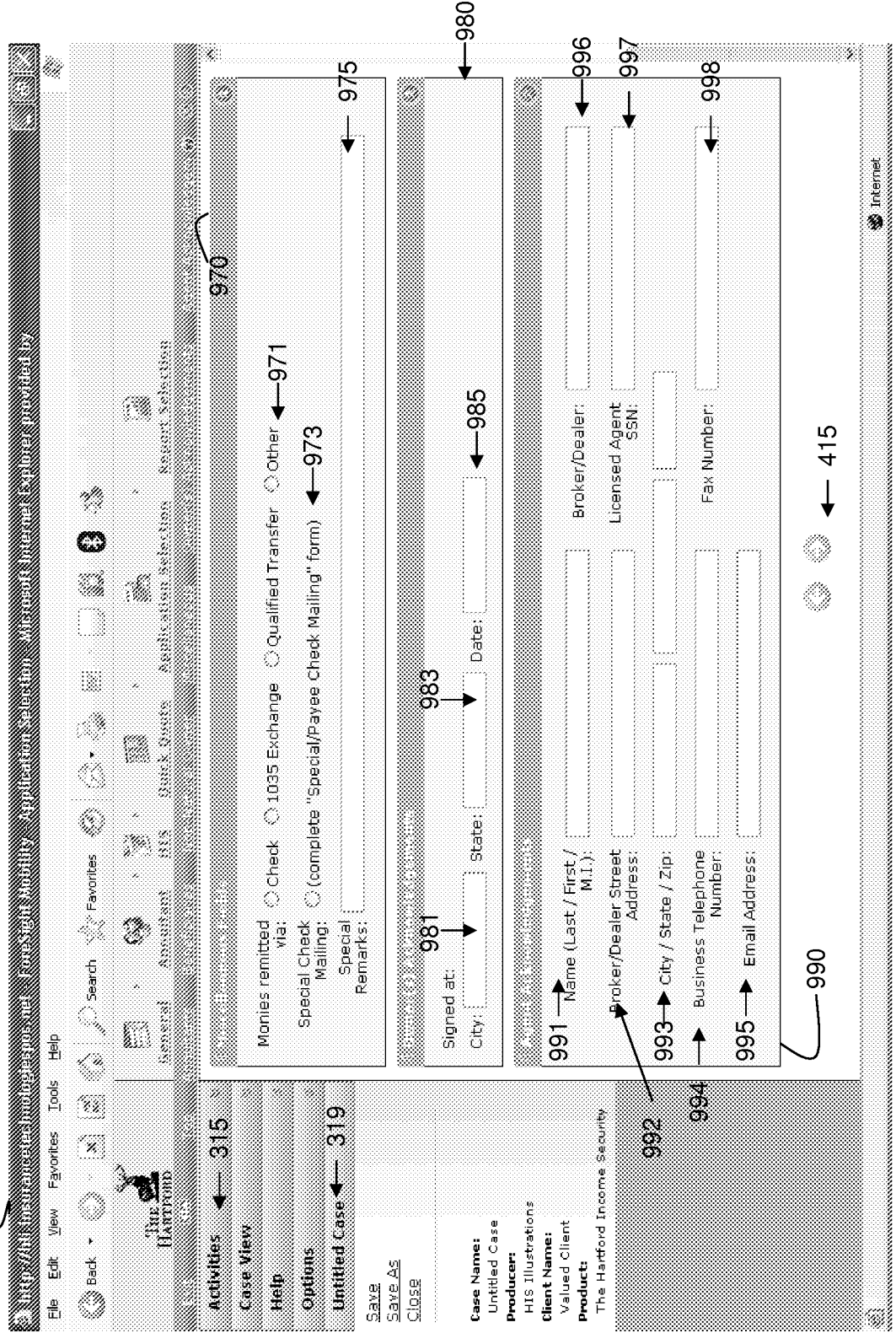
FIG. 9C is a screenshot of the application page of a web-based interface depicting the miscellaneous information of a sample contract in accordance with the preferred embodiment of the present invention.

If a user of the system is satisfied with the results of the report, he or she is able to fill out an online application and apply for the hypothetical contract constructed. This is done by accessing an application by selecting untitled case tab 319 from the web-based interface of the present invention. When a user opts to apply online, he or she is directed to an application web page interface 900 as depicted by FIGS. 9A-C. Application interface 900 comprises annuitant information window 925, beneficiary window 927, non-natural owner window 950, miscellaneous window 970, owner acknowledgement window 980, and agent acknowledgement window 990.

Annuitant window 925 is an interactive window that allows a user to enter application information related to the annuitants, whether they be single annuitants or joint annuitants. A user enters an annuitant's personal information through various fields, including title toggle button 901, address text field 903 and 905, and phone number text field 907. Similarly, a user can enter any data related to a joint annuitant's personal information through title toggle button 909, address text field 911 and 913, and phone number text field 915. Other information such as whether the joint annuitant is also the owner and whether the joint annuitant is the annuitant's spouse can be verified through the use of toggle buttons 917 and 919 respectively.

As shown in FIG. 9B, beneficiary window 927 comprises information related to any beneficiary elected by the user. It contains a series of interactive text fields that provide useful identification information through name textbox 933, birth date text box 935, and relationship to owner text box 931. Beneficiary window also allows a user to elect more than one beneficiary by allowing a user to designate a primary and secondary beneficiary, along with a corresponding distribution percentage, by utilizing text boxes 929 and 937, respectively. If a user elects more than one beneficiary, he or she can enter personal identification information regarding the second beneficiary through relationship to owner text box 939, name text box 941, and birth date text box 943.

Non-natural owner window 950 comprises information related to a non-natural owner of a contract such as a trust fund, a corporation, etc. Window 950 comprises interactive fields allowing an applicant to provide identifying information in a series of text boxes. The text boxes include name text box 951, trustee textbox 953, tax identification text box 955, address text boxes 957 and 959, and phone textbox 961.

As shown in FIG. 9C, application interface 900 provides miscellaneous information window 970. Window 970 allows a user to provide information related to payment methods via a series of toggle boxes and text boxes. The boxes include payment method toggle box 971, special payment toggle box 973 and remarks text box 975.

Owner acknowledgement window 980 and agent acknowledgement window 990 allow an applicant and agent to verify that the information provided in the various previous application windows is accurate. Owner acknowledgement window 980 provides signature verification textboxes 981, 983, and 985 to verify the city, state, and date of the owner's signature.

Similarly, agent acknowledgment window 990 provides a series of interactive fields from which an agent can provide information and verify that he or she has provided accurate information. The interactive fields include agent name text box 991, address text boxes 992 and 993, telephone number text box 994, email address text box 995, fax number text box 998, broker name text box 996, and agent social security number text box 997.

As previously discussed, application interface 900 comprises scroll button 415, which validates the entries on page 900, saves the data in the aforementioned database, and allows a user to access the next phase of the system.

Figure 10:
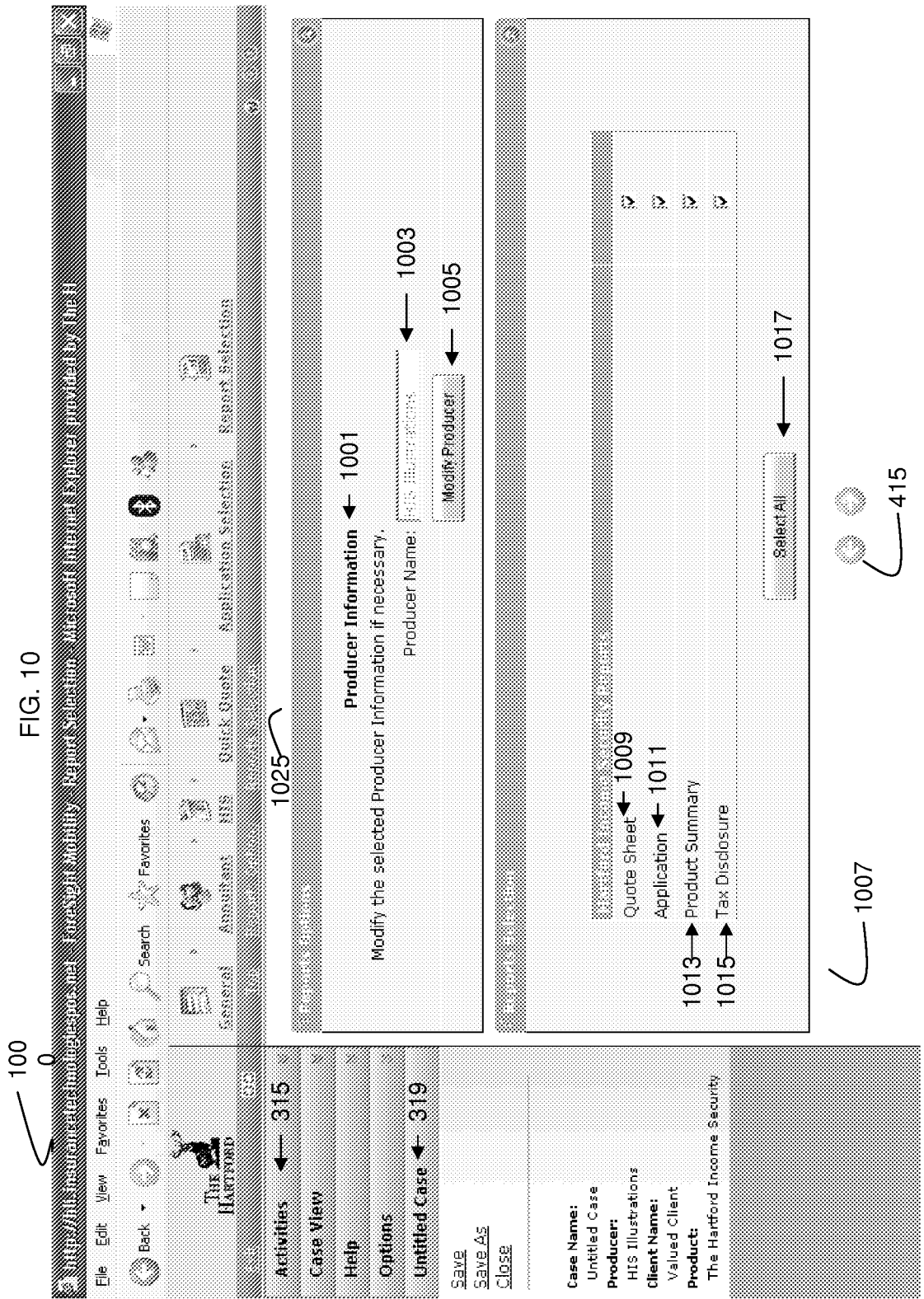
FIG. 10 is a screenshot of the report page of a web-based interface depicting the overall information of a sample contract in accordance with the preferred embodiment of the present invention.

After the system verifies the data from application interface 900, it directs the user to report interface 1000 as depicted in FIG. 10. Report interface 1000 comprises report option window 1025 and report selection window 1007. The windows allow a user to print out the final application and report based on the data previously entered. Report option window 1007 provides information related to the report producer 1001 such as producer name 1003. It also allows the system to select and/or modify the producer by clicking on modify producer button 1005.

As shown in report selection window 1007, a user can select to print out one or more reports such as quote sheet 1009, application 1011, product summary 1013, and tax disclosure 1015 by clicking on the appropriate checkbox. Alternatively, a user can click select all button 1017 and elect to print out all of the reports.

Future embodiments of the present web based system will provide integration of products available on the system with industry clearing house data providers, including a data feed to brokers into customer statements and websites.

In addition, it is contemplated that future embodiments of the web based system will be integrated into third party online bill payment systems. This will allow the payments due on the contract to be directly paid online by the third party.

It is also contemplated that the web-based interface will be integrated directly with an administration system, allowing a client to purchase new or additional contracts as needed. FIGS. 11-19 detail the general parameters of such a process.

Figure 11:
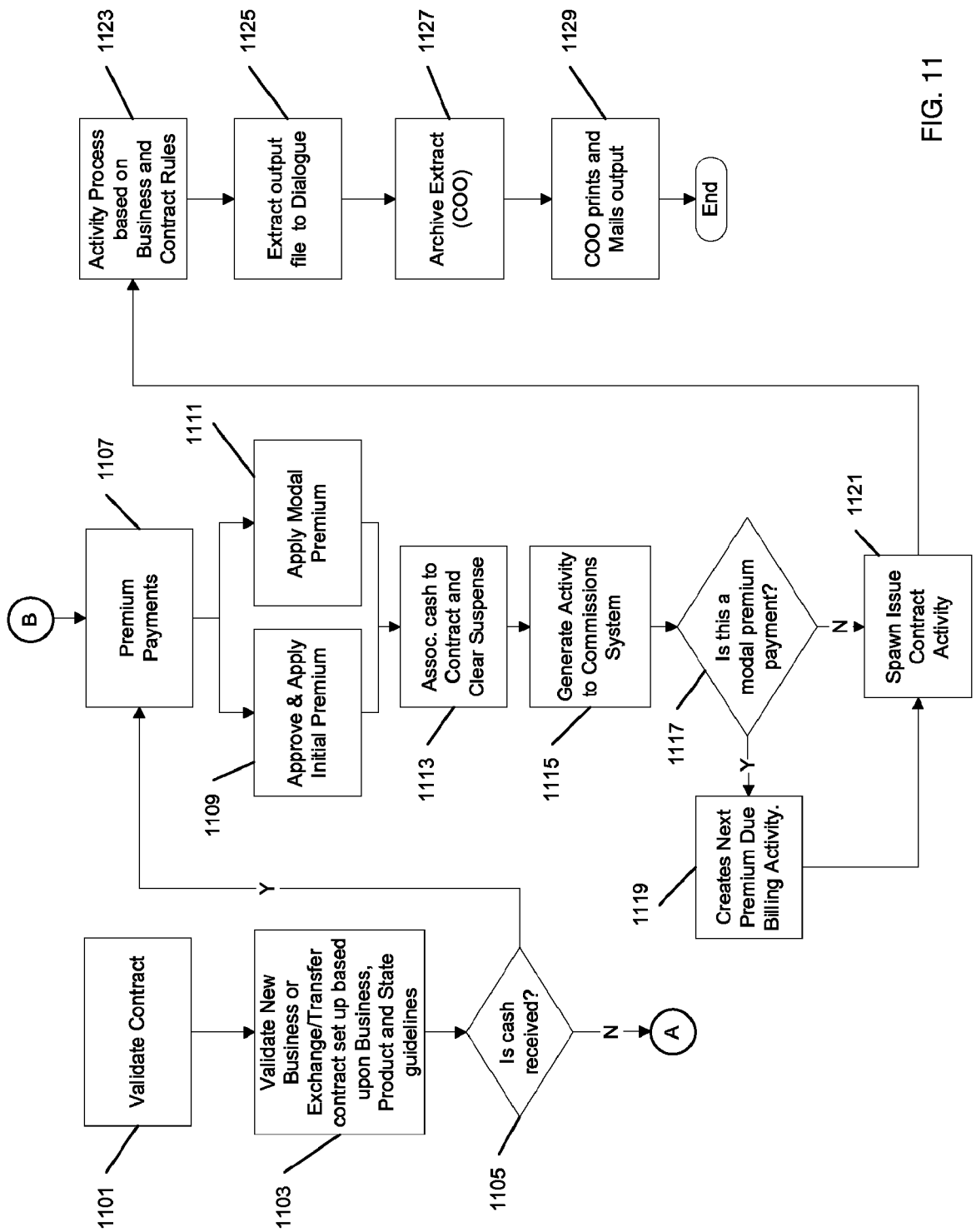
FIG. 11 is a flow diagram depicting the administration of a newly applied for longevity insurance contract in accordance with the present invention.

Referring now to FIG. 11, shown is a flow diagram depicting the administration of a newly applied for longevity insurance contract in accordance with the present invention. A user first applies for a longevity insurance contract either directly, through an authorized agent, or an employer (not shown). In the preferred embodiment, the contract is created utilizing web-based portal 300.

Figure 12:
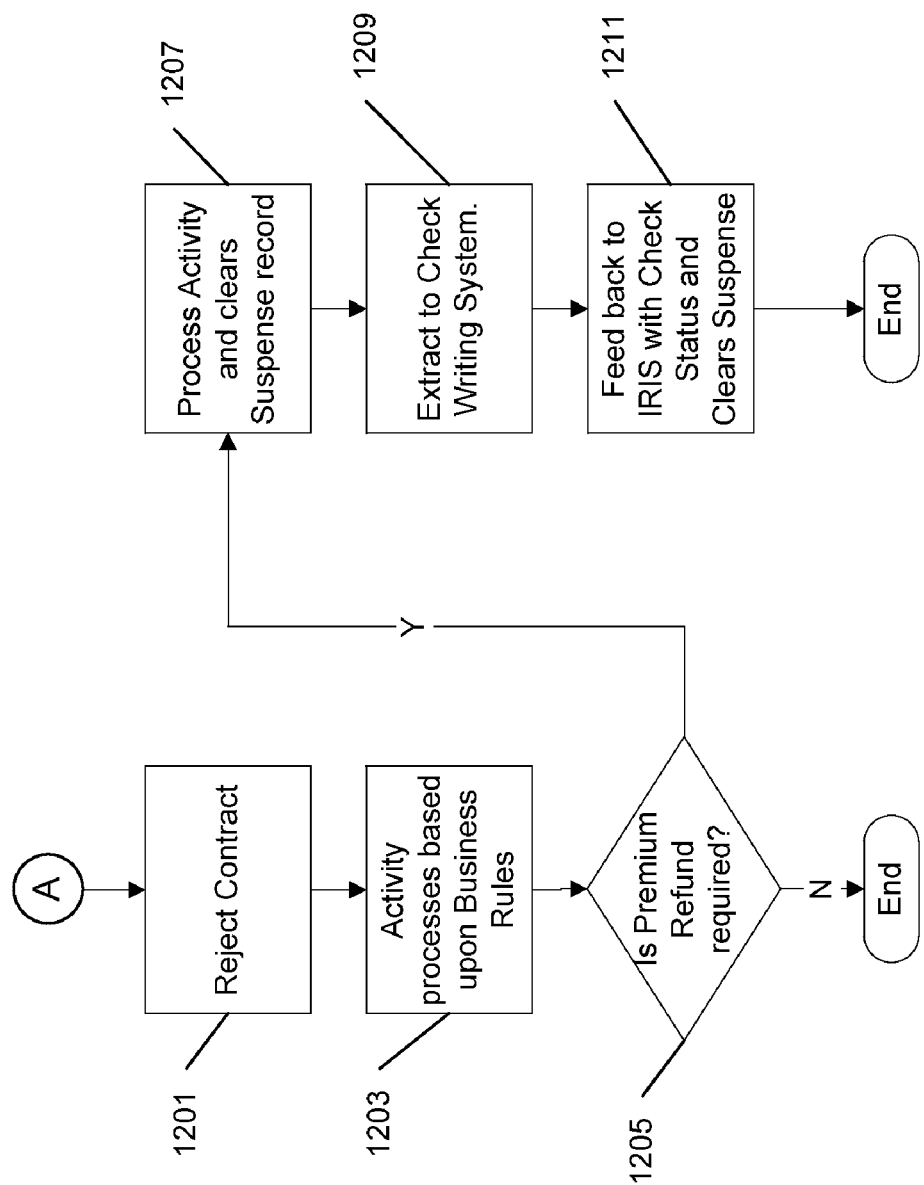
FIG. 12 depicts a flow chart of the administrative process of a rejected contract in accordance with the present invention.

After the information is entered into portal 300, it is validated by an integrated software system associated with portal 300 as depicted by 1101. In the preferred embodiment, a software application associated with portal 300 utilizes an algorithm based on business, product and state guidelines as depicted in 1103. However, as is known in the art, any other method for validating a contract can be utilized in accordance with the present invention. If the contract is not validated, it is rejected as depicted in FIG. 12. In addition, a user determines whether a premium is received. If no premium is received, the contract is rejected automatically as depicted in FIG. 12.

Turning now to FIG. 12, depicted is a flow chart depicting the administrative process of a rejected contract in accordance with the present invention. After the contract is rejected as depicted by 1201, the administrative system determines whether premium refund is due 1205 by utilizing a software algorithm based on business, product and state guidelines as depicted in 1203. If no refund is due, the contract is closed and the process is ended. If the administrative system determines that a refund is due, it initially processes the amount due and clears the balance remaining on the contract as depicted by 1207. A check is then automatically generated which corresponds to the amount owed as shown in 1209. When the check clears, the system is updated and the record of the contract is deleted from the administrative system as depicted by 1211.

Referring now back to FIG. 11, the administrative system applies any payment received on a valid contract and converts it to a premium payment as depicted by 1107. The premium payment, in turn, is allotted to initial premium 1109 and modal premium 1111 (if necessary). The administrative system then records payments 1109 and 1111 into a file associated with the appropriate contract as depicted by 1113.

When the payments are recorded, the administrative system automatically calculates any associated commission fees 1115 and determines whether a modal premium payment was deposited 1117. If a modal payment was made, the administrative system automatically generates the date on which the next premium payment is due 1119 and saves the data in the aforementioned contract file. If no premium payment is due, the administrative system updates and saves the contract file. In either case, the updated contract file is utilized to issue the stored contract 1121 by utilizing a software algorithm based on business, product and state guidelines as depicted in 1123.

The administrative system then extracts the relevant data to a separate file 1125, where it is archived 1127. The data is then used to print and mail a copy of the contract to the relevant party as depicted by 1129.

Figure 13:
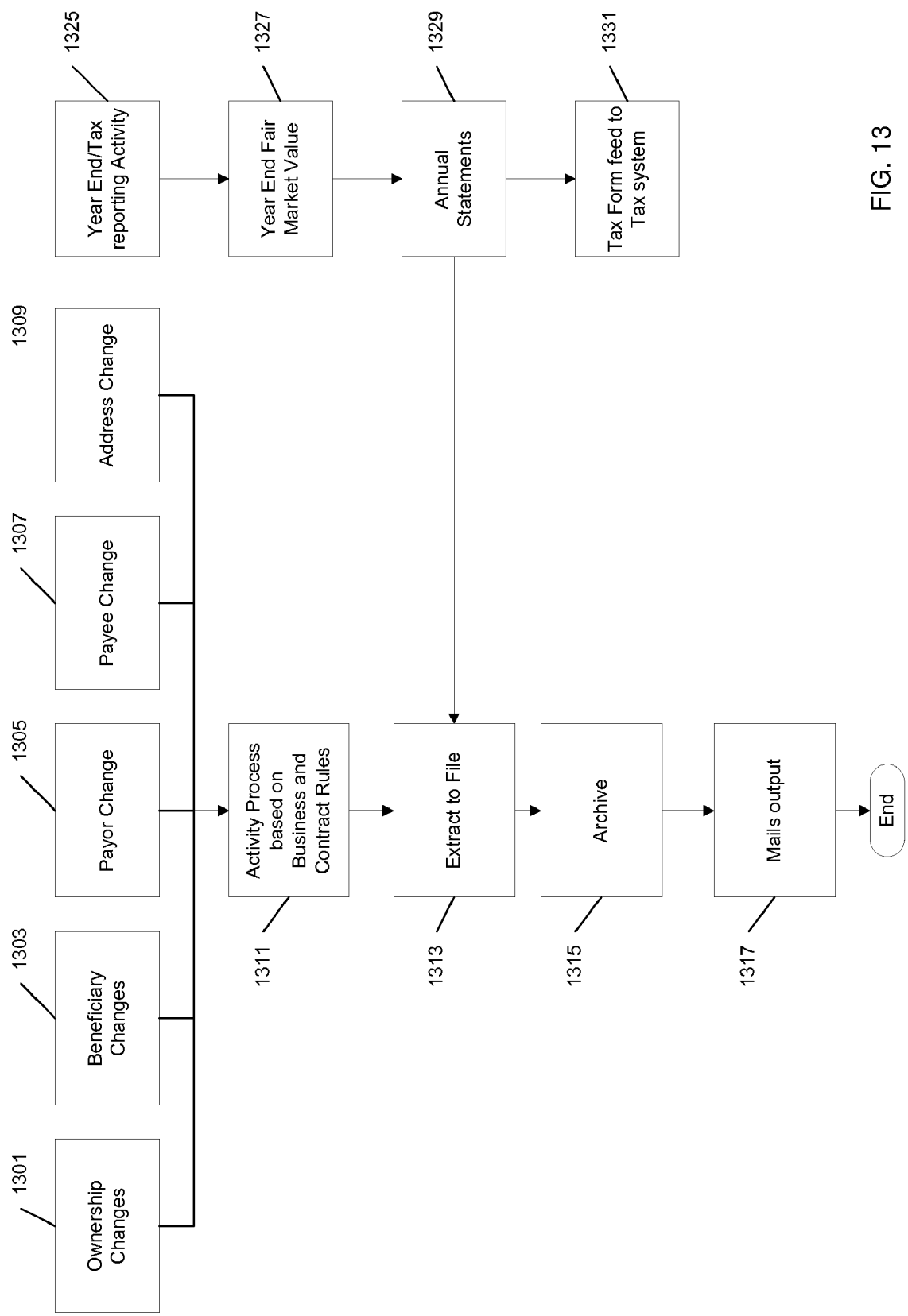
FIG. 13 depicts a flow chart of several of the contract parameters which can be updated using an administrative system in accordance with the present invention.

Advantageously, the administration system of the present invention allows a user to quickly and accurately update relevant information related to a longevity insurance contract as depicted in FIG. 13. FIG. 13 depicts a flow chart of several of the contract parameters which can be updated using an administrative system in accordance with the present invention. For example, a user can update the file information related to a contract file for a change to such parameters as ownership 1301, beneficiary 1303, payor 1305, payee 1307, and address 1309. It is contemplated that any other contract parameter can be updated utilizing an administrative system in accordance with the present invention.

After changing one or more parameters stored in a file, the administrative system utilizes a software algorithm based on business, product and state guidelines as depicted in 1311 to update and save the file. The administrative system then extracts the relevant data to a separate file 1313, where it is archived 1315. The data is then used to print and mail a copy of the contract to the relevant party as depicted by 1317.

Optionally, the administrative system can monitor the tax consequences of a contract and store the relevant information in the contract file as depicted by 1325. In practice, the system determines the market value of the longevity insurance contract 1327, generates one or more annual statements 1329 which are sent to the extracted file for archival and printing. Optionally, the generated annual statements can be sent to a separate tax administration system as depicted by 1331.

Figure 14:
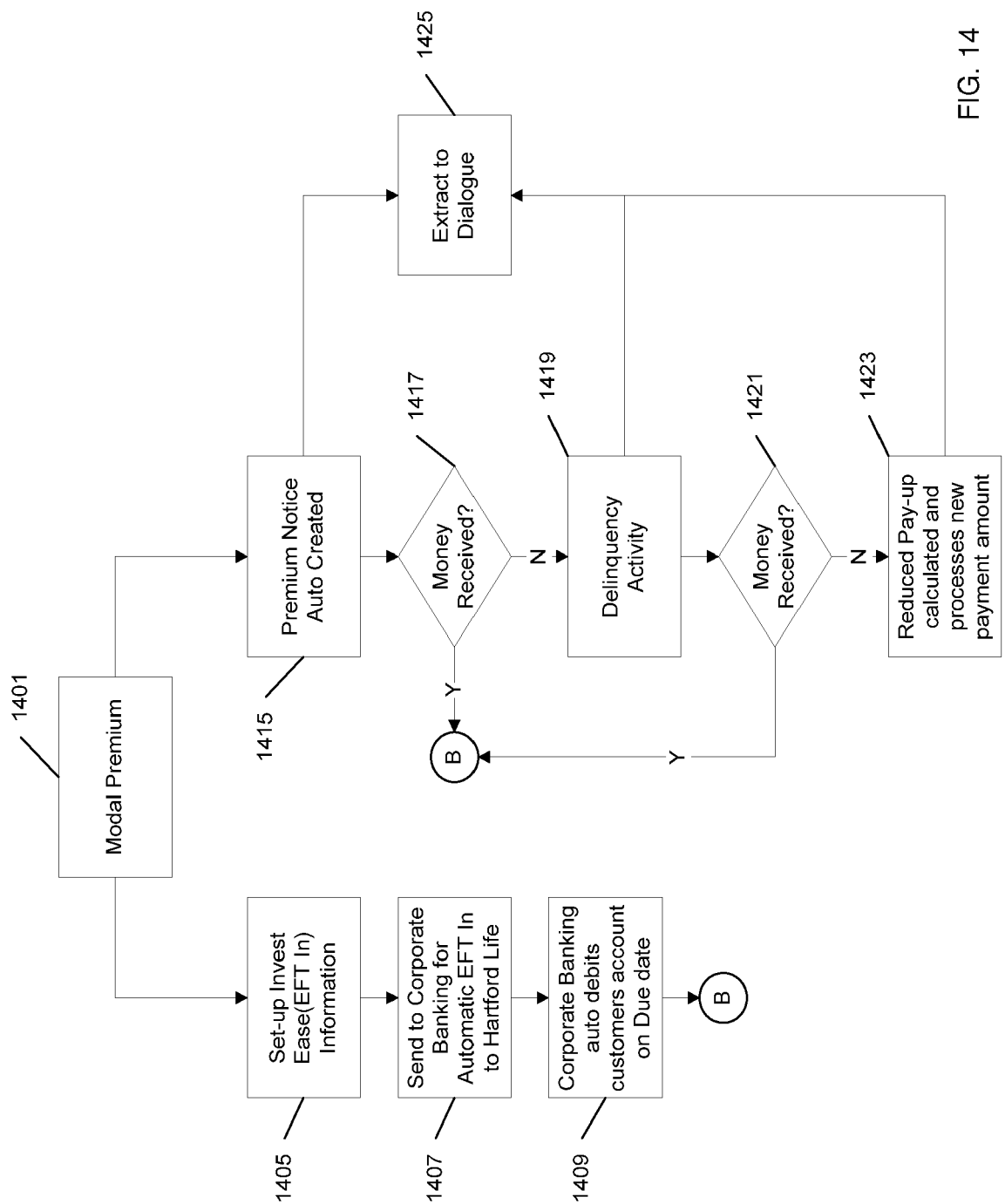
FIG. 14 depicts a flow chart for the management of modal premium payments and the generation of associated premium notices and or reports.

The administrative system of the present invention also provides for the management of modal premium payments and the generation of associated premium notices and/or reports, as depicted in FIG. 14.

After a user opts to utilize the modal premium feature as depicted by 1401, the administrative system can directly withdraw the modal premium amount from an account or automatically generate a premium due notice.

In order to automatically withdraw a modal premium from an associated account, the administrative system first authorizes the option and gathers the appropriate information as depicted in 1405. The appropriate information is saved in the contract file and sent to the appropriate financial institution as depicted in 1407. The financial institution automatically debits the appropriate account 1409 and notifies the administrative system as depicted in 1411, which verifies that the premium is received. Upon verification, the premium payments are allotted as described with reference to 1107 of FIG. 11.

Alternatively, the administrative system can generate premium payments due automatically as depicted in 1415. The administrative system then verifies whether a user responds to the notice in the form of a premium payment as indicated by 1417. If the premium is received and verified 1427, the premium payments are allotted as described with reference to 1107 of FIG. 11. If the premium payment is not received, a delinquency notice is generated 1419 and sent to the appropriate party. If the premium is paid in response to the delinquent notice 1421, the system responds as indicated with respect to step 1427. If no premium is paid in response to the delinquency notice, the administrative system automatically updates the contract by calculating the reduced pay-up amount 1423 and updating the contract file 1425.

Figure 15:
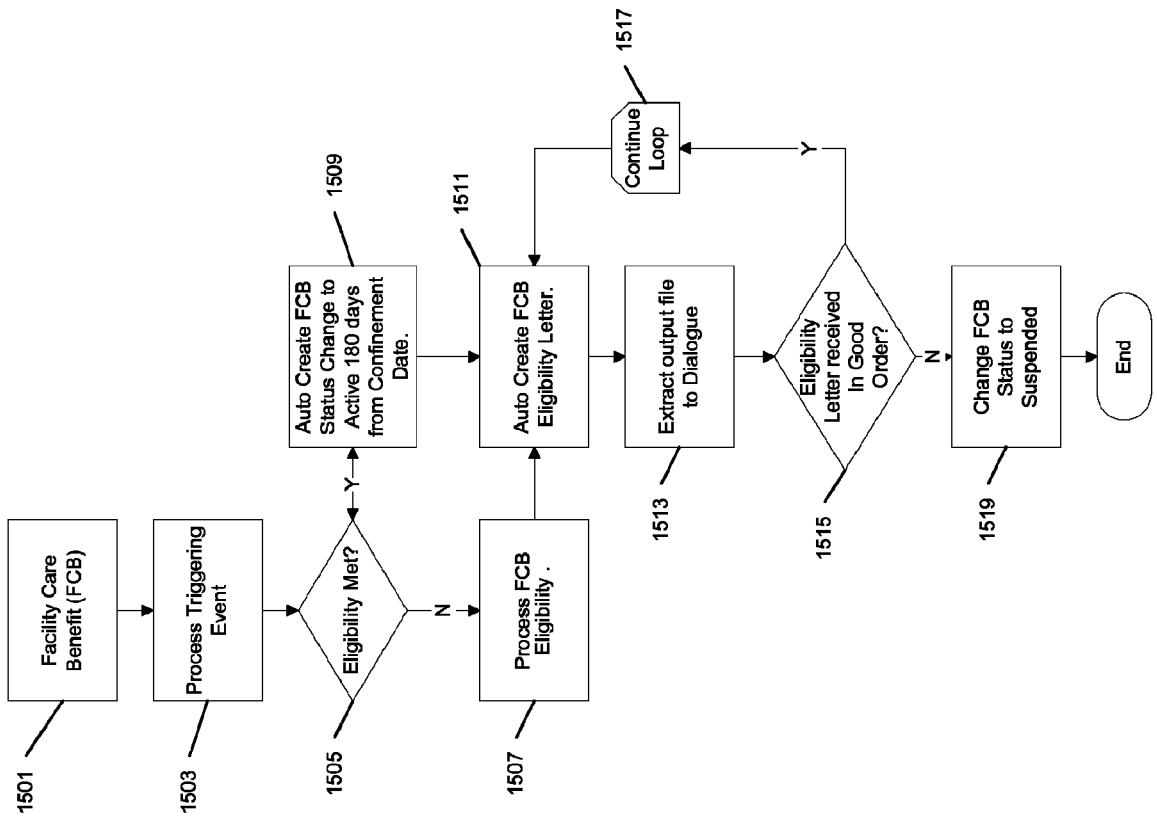
FIG. 15 depicts a flow chart of the process of administering the facility care portion of a longevity insurance contract in accordance with the present invention.

The administrative system of the present invention also allows a user to manage the facility care benefit portion of a longevity insurance contract. FIG. 15 depicts a flow chart of the process of administering the facility care portion of a longevity insurance contract in accordance with the present invention.

After the system verifies that a file contract contains the facility care benefit rider as depicted in 1501, the system processes the specific triggering events associated with the benefit 1503. The system then determines whether eligibility is met 1505 or not 1507. If it is, the system updates the file to indicate that the appropriate status of the facility care benefit rider as depicted in 1509. In response to this action, the system automatically generates an eligibility letter 1511, saves the file, and extracts it to a secondary file for printing 1513. The system then monitors whether the letter was received as depicted in 1515. If the eligibility is confirmed, the process is periodically continued as depicted by 1517. If eligibility is not confirmed, the facility care benefit status is changed and updated in the associated file as depicted in 1519.

Figure 16:
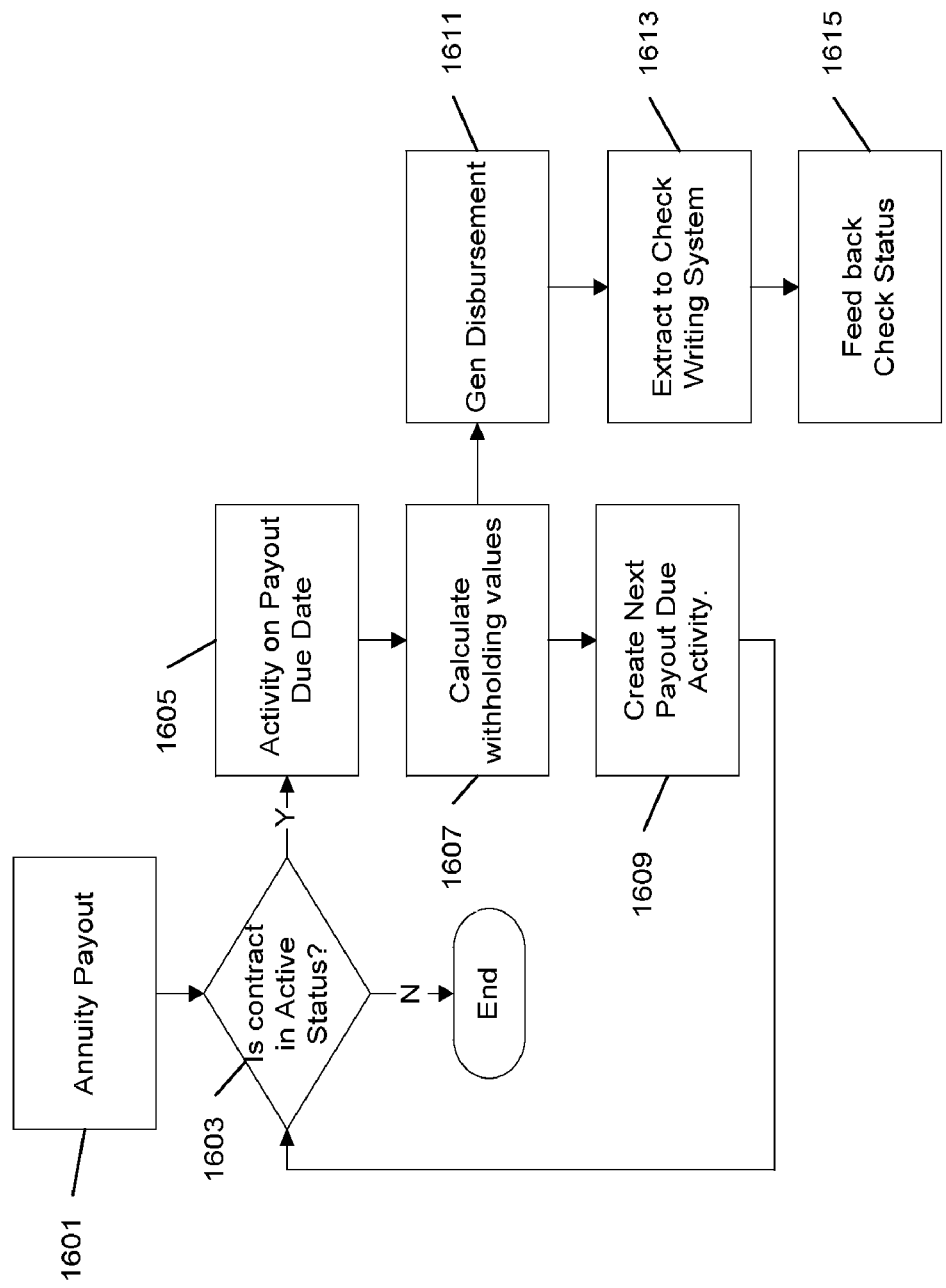
FIG. 16 depicts a flow chart of a process for administering annuity payouts in accordance with the present invention.

The present invention also provides for efficient administration of annuity payouts. FIG. 16 depicts a flow chart of a process for administering annuity payouts in accordance with the present invention.

The administrative system first stores information related to an annuity payout in a file as depicted in 1601. The system automatically monitors whether the underlying annuity of the longevity insurance contract has reached the payout status as depicted in 1603. If the contract is in the payout phase, it extracts the due date from the file 1605 and calculates the amount due 1607. The system then updates the file by modifying the next payout due date as depicted in 1609.

The system then sends the calculated payment amount to an associated general disbursement file, where it is saved 1611 and sent to an associated check writing system, which issues the payment 1613. The system monitors when and if the payment is received (i.e., when the check clears) and updates the contract file 1615.

Figure 17:
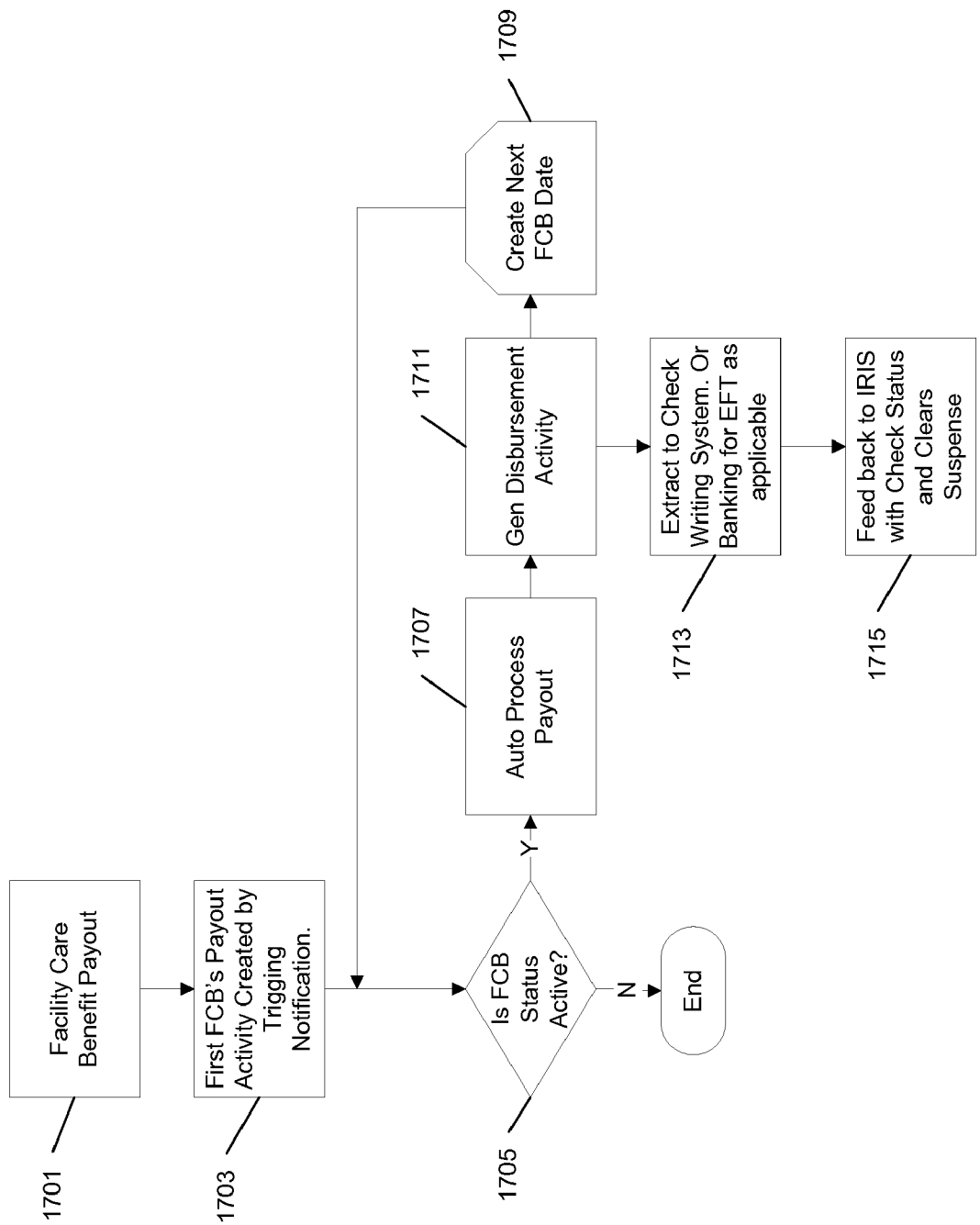
FIG. 17 depicts a flow chart of a process for administering facility care benefit payouts in accordance with the present invention.

The present invention also provides for efficient administration of facility care benefit payouts. FIG. 17 depicts a flow chart of a process for administering facility care benefit payouts in accordance with the present invention.

The administrative system first stores information related to a facility care benefit payment in a file as depicted in 1701. The system monitors whether the underlying facility care benefit rider of the longevity insurance contract has been triggered as depicted in 1703. The system then verifies whether the provision is active as depicted in 1705. If the provision has been triggered and is active, it extracts the due date from the file 1707 and calculates the amount due. The system then updates the file by modifying the next payout due date as depicted in 1709.

The system then sends the calculated payment amount to an associated general disbursement file, where it is saved 1711 and sent to an associated check writing system, which issues the payment 1713. The system monitors when and if the payment is received (i.e., when the check clears) and updates the contract file 1715.

Figure 18:
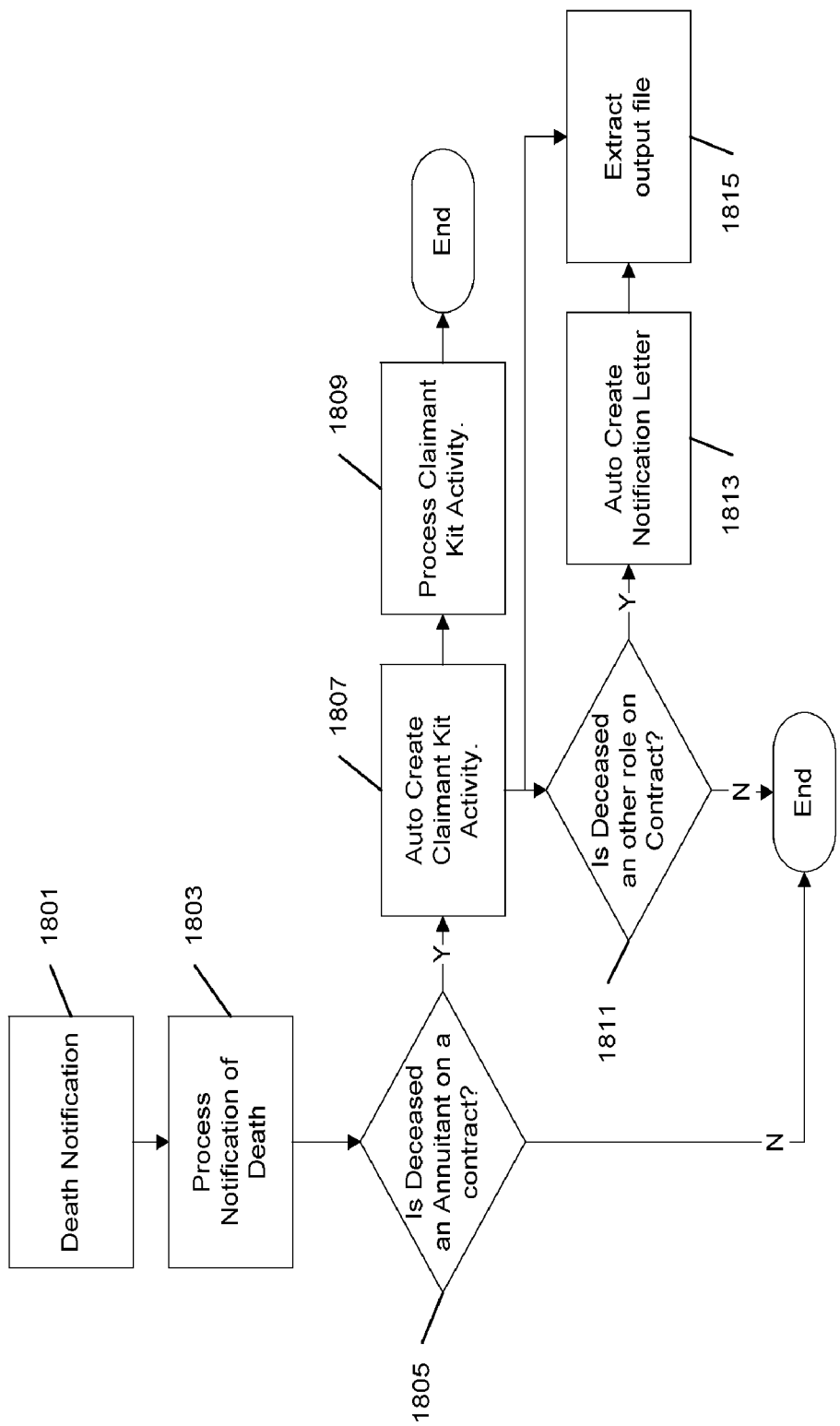
FIG. 18 depicts a flow chart depicting the administration of a longevity contract with respect to the death of a party named in the longevity contract.

The administrative system of the present invention also manages the death provisions of the underlying longevity contract. FIG. 18 depicts a flow chart depicting the administration of a longevity contract with respect to the death of a party named in the longevity contract. The administrative system first stores information related to the death of a party in a file as depicted in 1801, where the information is processed 1803.

The system then determines if the deceased party is an annuitant 1805. If so, it updates the file with respect to the claimant 1807 and processes any request by a claimant 1809. If the deceased is not an annuitant, the system determines in what way the deceased was associated with the contract, creates a notification letter 1813, updates the file 1815, and sends the letter to the appropriate party (not shown).

Figure 19:
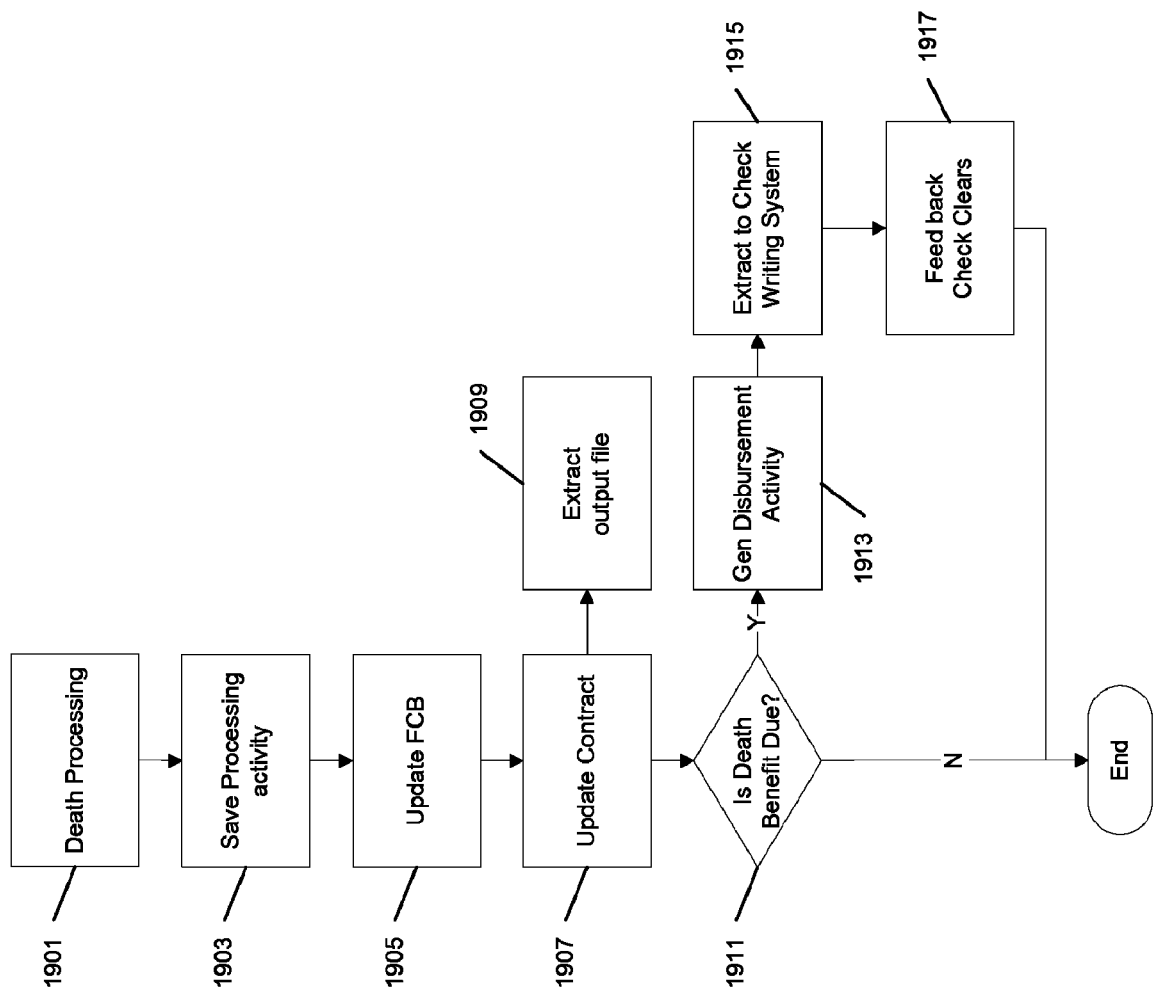
FIG. 19 depicts a flow chart of a process of administering benefits associated with a longevity insurance contract that are contingent upon a party's death such as a death benefit or a facility care benefit rider.

The administrative system of the present invention is also capable of automatically processing associated benefits related to a deceased party such as a death benefit or the expiration of a facility care benefit rider as depicted in FIG. 19. FIG. 19 depicts a flow chart of a process of administering benefits associated with a longevity insurance contract that are contingent upon a party's death such as a death benefit or a facility care benefit rider. The administrative system first stores information related to the death of a party in a file as depicted in 1901, where the information is processed 1903.

The system then updates any information related to an associated facility care benefit rider as depicted in 1905. Thereafter, the system updates the contract, and saves it in a secondary file as shown in 1909.

Next, the administrative system determines whether a death benefit is due on the associated longevity insurance contract as depicted in 1911. The system then sends the death benefit payment amount to an associated general disbursement file 1913, where it is saved and sent to an associated check writing system 1915, which issues the payment. The system monitors when and if the payment is received (i.e., when the check clears) and updates the contract file 1917.

What is claimed is:

1. A computer system for processing data related to a longevity insurance contract, comprising:
    a memory device storing data relating to the longevity insurance contract, including: a date for commencement of periodic payments under the longevity insurance contract and continuing for the life of one or more individual annuitant; data indicative of age of the one or more individual annuitants; data indicative of facility care benefit eligibility conditions comprising at least confinement of the annuitant to one of a convalescent home, nursing home and assisted living facility for an elimination period; and data indicative of a facility care benefit, the facility care benefit being an additional amount payable in periodic payments in response to a facility care event;

a system processor in communication with the memory device, the system processor being configured to, responsive to receipt of data indicative of an application for a facility care benefit, access from the memory device data related to the facility care benefit eligibility conditions, based on the received data and the data indicative of the facility care benefit eligibility conditions, determine whether the facility care benefit eligibility conditions are met, and responsive to determining that the facility care benefit eligibility conditions are met, cause a facility care benefit to be paid to the annuitant; and a payment issuing system in communication with the system processor for receiving data indicative of a determined amount of the facility care benefit from the system processor and for issuing a payment in the determined amount of the facility care benefit.

2. The computer system of claim 1, wherein the data indicative of facility care benefit eligibility conditions stored in the memory device further comprises confinement of an annuitant to a nursing home or an assisted living facility for at least an elimination period, and the nursing home or assisted living facility providing assistance to the annuitant for two or more activities of daily living.

3. The computer system of claim 1, wherein the data stored in the memory device further comprises data indicative of a facility care benefit eligibility period, the facility care benefit being available only upon expiration of the facility care benefit eligibility period.

4. The computer system of claim 3, wherein the data indicative of the facility care benefit eligibility period comprises data indicative of a facility care benefit eligibility period of at least ten years from an issue date of the longevity insurance contract.

5. The computer system of claim 1, wherein the system is further configured to, responsive to determining that the facility care benefit eligibility conditions are met, change data stored in the memory device and associated with the longevity contract to data indicative of an active facility care benefit status, provide data indicative of a facility care benefit eligibility letter to be dispatched, determine whether data indicative of confirmation of eligibility has been received responsive to the eligibility letter, and, responsive to determining that data indicative of confirmation of eligibility has not been received, update data stored in the memory device to data indicative of a suspended facility care benefit status.

6. The computer system of claim 1, wherein the data stored in the memory device further comprises data indicative of an initial annuity amount, the system processor being configured to, responsive to determining that a current date is not past the date for commencement of periodic payments, access from a memory storage device data indicative of a percentage of the initial annuity amount, and determine the amount of the facility care benefit based on the accessed percentage of the initial annuity amount.

7. The computer system of claim 1, wherein the annuitant is a relevant life under the longevity insurance contract.

8. The computer system of claim 1, wherein the data stored in the memory device further comprises data indicative of an annuity amount, the system processor being configured to, responsive to determining that a current date is past the date for commencement of periodic payments, access from a memory storage device data indicative of a percentage of the annuity amount, and determine the amount of the facility care benefit based on the accessed percentage of the annuity amount.

9. A computer-implemented method for administering a longevity insurance contract, comprising:

accessing by a computer system data stored in a memory device relating to the longevity insurance contract, including: data indicative of an annuity commencement date; and data indicative of periodic annuity payments commencing on the annuity commencement date and continuing for the life of one or more individual annuitants determining by the computer system whether facility care benefit eligibility conditions, the facility care benefit eligibility conditions comprising at least confinement of the annuitant to one of a convalescent home, nursing home and assisted living facility for an elimination period, are met, and responsive to determining that the facility care benefit eligibility conditions are met, update data in a memory device to indicate that a facility care benefit payment is to be made to the one or more individual annuitant, and determine a payout amount including a facility care benefit payment amount; and causing by a payment system, responsive to receipt of data from the computer system indicative of a payout amount, a payment to be made to the annuitant in the payout amount.

10. The computer-implemented method of claim 9, wherein the payment system comprises a check writing system.

11. The computer-implemented method of claim 9, wherein the annuitant is a relevant life under the longevity insurance contract.

12. The computer-implemented method of claim 9, further comprising determining a facility care benefit payment amount independent of facility care expenses.

13. The computer-implemented method of claim 9, further comprising accessing data indicative of a facility care benefit eligibility period, determining whether the facility care benefit eligibility period has expired, and, responsive to determining that the facility care benefit eligibility period has not expired, providing an output signal having data indicative that the annuitant is not eligible for the facility care benefit.

14. The computer-implemented method of claim 13, wherein the data indicative of the facility care benefit eligibility period comprises data indicative of the facility care benefit eligibility period being a period of years after an issue date of the longevity insurance contract.

15. The computer-implemented method of claim 9, wherein the annuity commencement date corresponds approximately to a life expectancy of the annuitant.

16. An computer system for processing data related to a fixed deferred annuity having an associated facility care benefit, comprising:

a memory device storing data relating to the fixed deferred annuity, including: an annuity commencement date, the annuity commencement date indicative of a date for commencement of periodic payments continuing for the life of one or more individual annuitant; data indicative of age of the one or more individual annuitants; data indicative of facility care benefit eligibility conditions comprising at least confinement of the annuitant to one of a convalescent home, nursing home and assisted living facility for an elimination period; and data indicative of a facility care benefit, the facility care benefit being an additional amount of periodic payments;

an administrative computer system in communication with the memory device, the administrative computer system being configured to, responsive to receipt of data indicative of an application for a facility care benefit, access from the memory device data related to the fixed deferred annuity and the facility care benefit eligibility conditions, based on the received data and the data indicative of the facility care benefit eligibility conditions, determine whether the facility care benefit eligibility conditions are met, and responsive to determining that the facility care benefit eligibility conditions are met, determine an amount of a facility care benefit payment; and a payment system in communication with the administrative computer system, the payment system configured to receive data indicative of the amount of the facility care benefit payment, and to generate a payment in the received amount to the annuitant.

17. The computer system of claim 16, wherein the administrative computer system is further configured to, responsive to receipt of data indicative of clearing of a check for a facility care benefit payment, update data in the memory device associated with the fixed deferred annuity to reflect the payment.

18. The computer system of claim 16, wherein the administrative computer system is configured to access data associated with the deferred annuity from the memory device, generate a statement based on the accessed data, and forward the generated statement for archiving and printing.

19. The computer system of claim 16, wherein the data stored in the memory device further comprises data indicative of an issue date of the deferred annuity and data indicative of a facility care benefit eligibility period of at least ten years from the issue date, the facility care benefit being available only upon expiration of the facility care benefit eligibility period.

20. The computer system of claim 16, wherein the data stored in the memory device further comprises data indicative of an annuity amount and a percentage of the annuity amount, the administrative computer system being configured to access from the memory device the data indicative of the annuity amount and the percentage, and determine the amount of the facility care benefit based on the annuity amount and the percentage.

* * * * *